(12) United States Patent  
Dinh

(10) Patent No.: US 7,271,335 B2
(45) Date of Patent: Sep. 18, 2007

(54) COMBINATION MOUNTING BRACKET AND ADAPTER PLATE FOR MOUNTING ELECTRICAL BOXES

(75) Inventor: Cong Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 39 days.

(21) Appl. No.: 10/944,529

(22) Filed: Sep. 17, 2004

(65) Prior Publication Data

US 2005/0067180 A1  Mar. 31, 2005

Related U.S. Application Data

(60) Provisional application No. 60/507,024, filed on Sep. 29, 2003, provisional application No. 60/561,641, filed on Apr. 13, 2004.

(51) Int. Cl.
*H01H 9/02* (2006.01)

(52) U.S. Cl. .............................. 174/58; 174/50; 174/57; 174/53; 220/3.2; 220/3.3; 248/906

(58) Field of Classification Search ................... 174/58, 174/54, 52.1, 53, 61, 63, 520, 480, 481, 50, 174/57, 503; 248/300, 27.1, 906, 200, 56, 248/57, 68.1, 343, 205.7, 298.1; 220/3.3, 220/3.9, 3.2, 3.4, 3.5, 3.6, 3.7, 3.8; 312/245; 439/535

See application file for complete search history.

(56) References Cited

U.S. PATENT DOCUMENTS

| 1,056,759 | A | 3/1913 | Mallery |
| 1,288,024 | A | 12/1918 | Kendig |
| 1,756,361 | A | 4/1930 | Johnson |
| 1,790,031 | A | 1/1931 | Vaughn |
| 1,982,957 | A | 12/1934 | Knell ............................ 247/22 |
| 2,269,211 | A | 1/1942 | Kuykendall ................. 248/201 |
| 2,486,764 | A | 11/1949 | Singer ......................... 175/298 |
| 2,881,924 | A | 4/1959 | Kruse et al. ................... 211/26 |
| 3,038,020 | A | 6/1962 | Winter et al. ................. 174/53 |
| 3,039,729 | A | 6/1962 | Nagle, Sr. .................... 248/343 |
| 3,182,805 | A | 5/1965 | Foster, Jr. et al. ............ 211/26 |
| 4,790,505 | A | 12/1988 | Rose et al. ............... 248/205.1 |
| 4,832,297 | A | 5/1989 | Carpenter ................ 248/205.1 |
| 4,964,525 | A | * 10/1990 | Coffey et al. ................ 220/3.9 |
| 5,009,383 | A | 4/1991 | Chapman .................... 248/343 |
| 5,098,046 | A | 3/1992 | Webb ......................... 248/27.1 |
| 5,114,105 | A | * 5/1992 | Young ........................ 248/27.1 |
| 5,224,673 | A | 7/1993 | Webb ......................... 248/27.1 |
| D342,938 | S | 1/1994 | Cheatham ................. D13/154 |
| 5,288,041 | A | 2/1994 | Webb ......................... 248/27.1 |
| 5,330,137 | A | 7/1994 | Oliva ......................... 248/27.1 |

(Continued)

*Primary Examiner*—Angel R. Estrada
(74) *Attorney, Agent, or Firm*—Hoffman & Baron, LLP

(57) ABSTRACT

A mounting system for securing an electrical box within a wall of a building. The electrical box is of typical construction having an open side thereof. The mounting system consists of an elongated bracket having one end region secured to the wall structure and a generally rectangular opening therein sized to permit access to the open side of the electrical box.

An adapter plate is mounted to the bracket with this adapter plate having a central opening that is also sized to permit access to the open side of the electrical box. The adapter plate is further configured with box mounting structure to secure the electrical box to the adapter plate.

20 Claims, 18 Drawing Sheets

U.S. PATENT DOCUMENTS

| | | |
|---|---|---|
| 5,405,111 A | 4/1995 | Medlin, Jr. ............... 248/205.1 |
| 5,423,499 A | 6/1995 | Webb ........................ 248/27.1 |
| 5,516,068 A * | 5/1996 | Rice ............................ 248/300 |
| 5,927,667 A | 7/1999 | Swanson .................... 248/300 |
| 5,931,425 A | 8/1999 | Oliva ....................... 248/200.1 |
| 6,098,939 A | 8/2000 | He ........................... 248/205.1 |
| 6,188,022 B1 | 2/2001 | He .............................. 174/58 |
| 6,209,836 B1 | 4/2001 | Swanson .................... 248/300 |
| 6,384,334 B1 | 5/2002 | Webb ........................... 174/58 |
| 6,545,214 B2 | 4/2003 | Russell et al. ................ 174/48 |
| 6,573,449 B2 | 6/2003 | Vrame ......................... 174/58 |
| 6,590,155 B2 | 7/2003 | Vrame et al. ................. 174/50 |
| 6,723,918 B2 | 4/2004 | Vrame ......................... 174/50 |
| 6,765,146 B1 | 7/2004 | Gerardo ....................... 174/58 |

* cited by examiner

COMBINATION MOUNTING BRACKET AND ADAPTER PLATE FOR MOUNTING ELECTRICAL BOXES

Incorporated by reference is U.S. Provisional Application No. 60/507,024 filed Sep. 29, 2003 and U.S. Provisional Application No. 60/561,641 filed Apr. 13, 2004. Reference to these earlier applications may be desired for further background, explanation and/or description.

FIELD OF THE INVENTION

This invention pertains to a bracket for mounting electrical boxes within the walls of a building and more particularly to a bracket employing one or more adapter plates to which the electrical box is secured and which is separately mounted to the bracket.

BACKGROUND OF THE INVENTION

There are many different methods used to secure electrical boxes within the walls of a building. The most common is, of course, to secure the box directly to the stud. The advantage of this system is that installation is quick and simple but there is no guarantee that all the boxes secured in this fashion will be the same height off the floor. Also, there is no guarantee that all the boxes will be positioned at the same depth within the wall cavity which is important so that any dry-wall ring or other device subsequently secured to the box will fit properly on the wall material.

However, if the architectural plans call for the box or boxes to be mounted some distance from a stud, then these stud-mounting means are futile. In this case, a bracket is required in order to support the box some distance from the stud. There are basically two different types of brackets used for this, either horizontal wall-mounted brackets or vertical floor-mounted brackets. In either case, once a particular electrical box size is selected and secured to the bracket, the installer is thus limited to using only a correspondingly sized dry-wall ring or other cover attachment.

Many varieties of floor-mounted and wall mounted brackets are known. In each of them, however, the box is directly attached to the bracket with no consideration given to securing the box to a separate adapter plate that is then secured to the bracket so as to increase the cover size options available to the installer. In other words, by securing the box to the adapter plate rather than to the bracket, the installer now has the option of using differently sized cover/dry wall rings which would not be possible without the use of the adapter plate.

It is thus an object of the present invention to provide a bracket (which can be either floor, wall or ceiling mounted) for mounting electrical boxes within the walls of a building that overcomes this deficiency. One object of this invention is to provide a bracket/adapter plate combination that is simple in construction and easy to install yet still enables the user to support an electrical box at a variety of different heights above the floor. Another object of this invention is to provide an adapter plate that can accept a variety of different sized cover/dry wall rings so as to cover the opening in an electrical box also secured to the adapter plate. Yet another object of this invention is to provide a bracket to which this adapter plate can be mounted while still allowing for the location of the box to be adjusted as needed, even field adjustment. Still another object of this invention is to provide an adapter plate that can be mounted either directly to a stud or to either a floor or wall mounted bracket. It is yet another object of this invention to provide an adapter plate that is designed so that multiple boxes can be ganged together should the need arise, whether the adapter plate is mounted directly to the stud or to a floor mounted bracket. These and other objects and advantages of this invention will become obvious upon further investigation.

SUMMARY OF THE INVENTION

This invention pertains to a mounting system for securing an electrical box having an open side thereof within the wall of a building. The mounting system consists of a generally elongated bracket having one end region configured for securement to a wall structure of the building. The bracket is further configured with a generally rectangular opening therein which is sized to permit access to the open side of the electrical box. An adapter plate is likewise configured with an opening therein sized to permit access to the open side of the electrical box. The adapter plate contains mounting structure to secure the adapter plate to the bracket. Box mounting structure on the adapter plate is used to secure the electrical box to the adapter plate.

DETAILED DESCRIPTION OF THE PREFERRED EMBODIMENT

Figure 1:
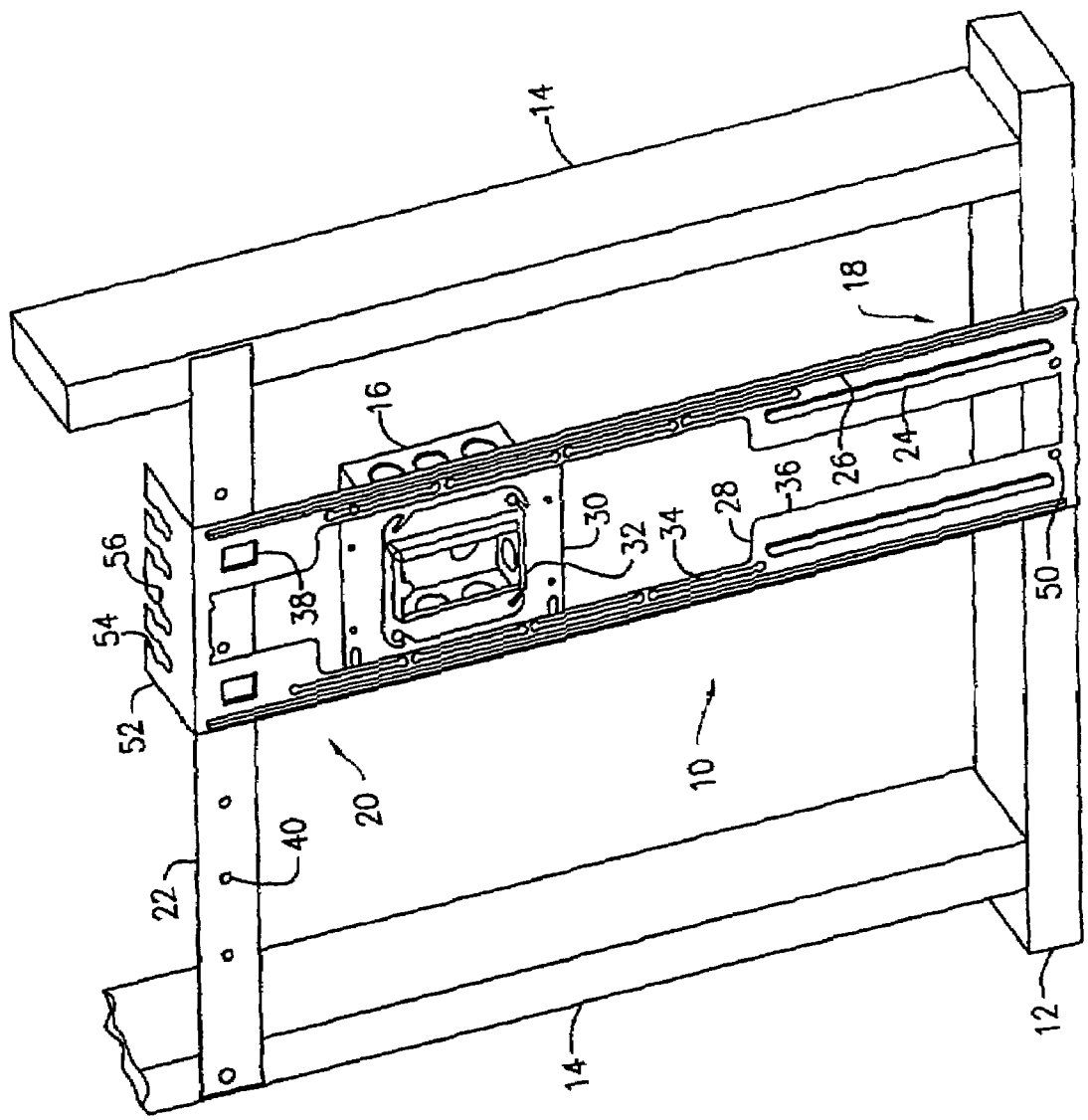
FIG. 1 is a pictorial view of the invention shown installed to the wall studs and floor track of a building under construction.
Figure 3:
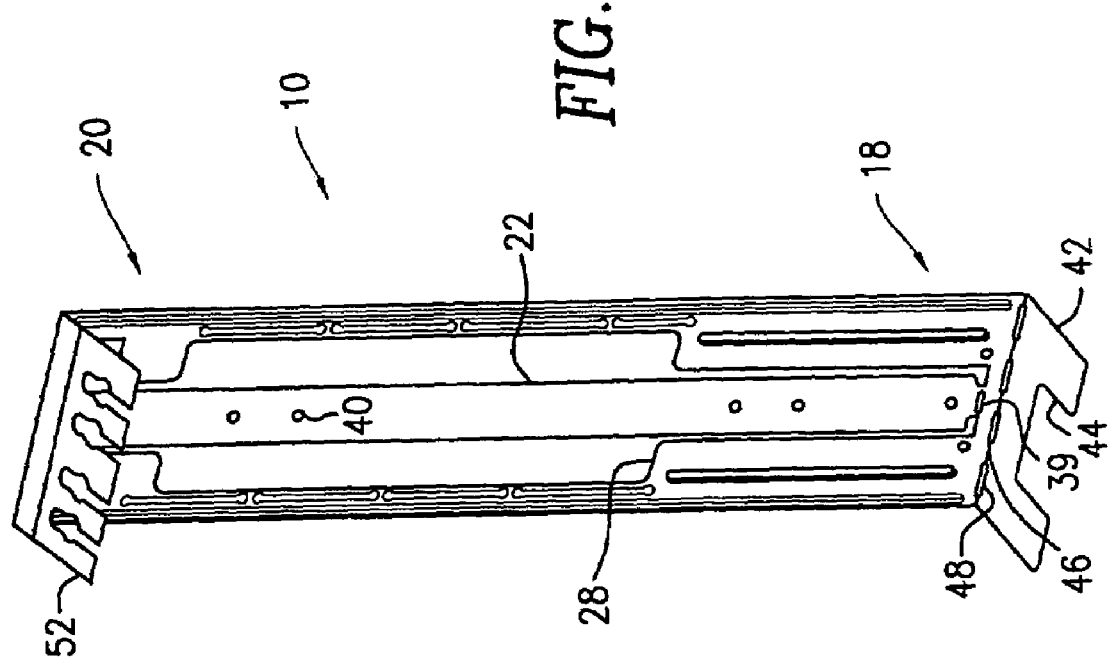
FIG. 3 is a pictorial back view of the invention in its pre-installed state.
Figure 2:
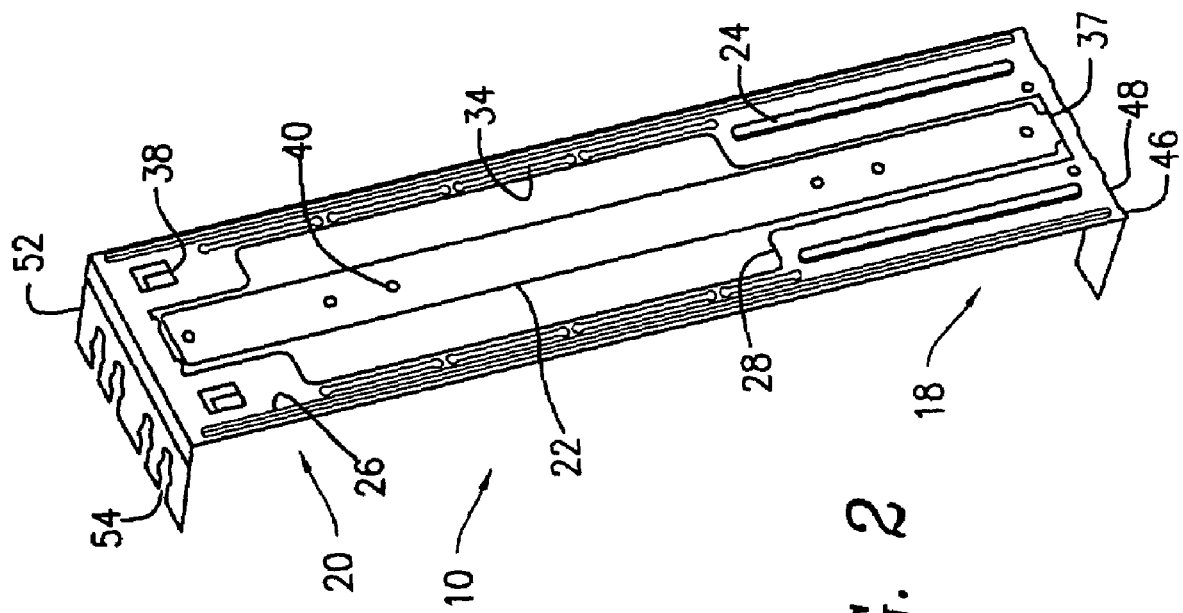
FIG. 2 is a pictorial front view of the invention in its pre-installed state.

Referring initially to FIGS. 1-3, there is shown in this embodiment bracket 10 extending vertically from floor track 12 between two adjacent wall studs 14 of a building. Bracket 10 is elongated in shape and is shown as being constructed from thin metal material, but other materials are equally suitable and bracket 10 need not be unitary as illustrated. Bracket 10 is designed to mount an electrical box 16 a desired distance above the floor of the building within a wall cavity between adjacent studs 14, this box 16 abutting the back surface of bracket 10.

A lower portion 18 of bracket 10 can be directly mounted to floor track 12 such as via screws or nails. This lower portion can also be slightly offset for both better securement to the floor track and to inset the remainder of bracket 10 slightly into the wall structure in order to accommodate the thickness of any plaster ring or other plate that may be mounted to the front side of bracket 10.

Upper portion 20 of bracket 10 is supported by bar 22 that spans generally perpendicularly between studs 14. Bar 22 prevents upper portion 20 of bracket 10 from deflecting into or away from (i.e. in either direction) the wall cavity. Ribs and/or stiffeners 24 and 26 extend along the length of bracket 10 as needed to also provide stiffness or rigidity. As explained below, bar 22 may form a part of bracket 10 or bar 22 may be separately supplied and subsequently secured to bracket 10 in the manner described.

The embodiment shown discloses bracket 10 supported via floor track 12 and wall studs 14. Alternatively, bracket 10 could be mounted to a ceiling support or a wall corner support. It is only required that bracket 10 be mounted to a wall support or wall structure of some kind, whether such wall support/structure be the floor track 12, stud 14, ceiling support, corner support, brace or other supporting structure typically found or employed in a building.

Generally rectangular or central opening 28 in bracket 10 allows for access to the interior of box 16. As will be described in greater detail below, box 16 may be mounted to one side of adapter plate 30 while typical cover or dry-wall ring 32 is mounted to the opposite side of adapter plate 30. It is adapter plate 30 that is secured to bracket 10 via elongated slots 34 extending on opposite sides of opening 28. Slots 34 are shown as having key-hole shaped ends, but other configurations are equally likely. One advantage of the keyhole-shaped slots shown is that a screw head can pass through the larger keyhole and then be slid along slot 34 to the desired location before being tightened. Additionally, in FIG. 1, slots 34 are shown as being off-set with respect to each other, this enables adapter plate 10 to be mounted at any location along opening 28. Such adjustability is accomplished by either simply rotating adapter plate 30 or using different diagonal openings in adapter plate 30 to secure it to bracket 10.

In the embodiment shown, a second opening 36 within the confines of bracket 10 overlaps or extends on both sides of opening 28. This second opening 36 is what remains of bracket 10 after bar 22 is removed therefrom. Of course, bracket 10 could also be constructed so that bar 22 extends alongside an outer elongated edge of bracket 10 if desired or bar 22 can be separately supplied. In the event bar 22 is provided alongside bracket 10, this would simply require a wider plate from which bracket 10 is constructed. Nevertheless, during installation, if bar 22 is pre-attached to bracket 10 (as compared to being separately supplied), then bar 22 would first be removed or separated from bracket 10 (either from its internal or external location) via score line 37 and/or slot 39 in the normal fashion by flexing bar 22 back and forth. One or more such attachment locations may be at the ends of bar 22 as shown or they may be found along an elongated edge of bar 22 (such as one adjacent lower portion 18 and one adjacent upper portion 20) or any combination thereof.

Once bar 22 and bracket 10 are separated, bar 22 would be secured to or through upper bar supports 38 in a perpendicular fashion as shown so as to support upper portion 20 of bracket 10. Bar 22 would then be secured to one or more studs 14 depending on their availability and the degree of support desired. Alternatively, bar 22 could be secured to studs 14 before being coupled to bracket 10. In any event, apertures 40 are provided in bar 22 for use in securing bar 22 to the stud or, if desired, bar 22 could be secured to studs 14 via apertures newly created in the field (such as by driving a screw anywhere through bar 22). Apertures 40 would ideally be provided for the typical stud 14 spacing in a building (i.e. 16 inch or 24 inch), but other spacings are equally possible. In the event lower portion 18 of bracket 10 has not yet been fixed to floor track 12, bracket 10 can then be slid to its desired location between studs 14 by moving it along bar22/floor track 12. Hence, once positioned, box 16 is not only at the proper vertical height above the floor, but it is also now properly located along the horizontal extent of the wall.

Figure 4:
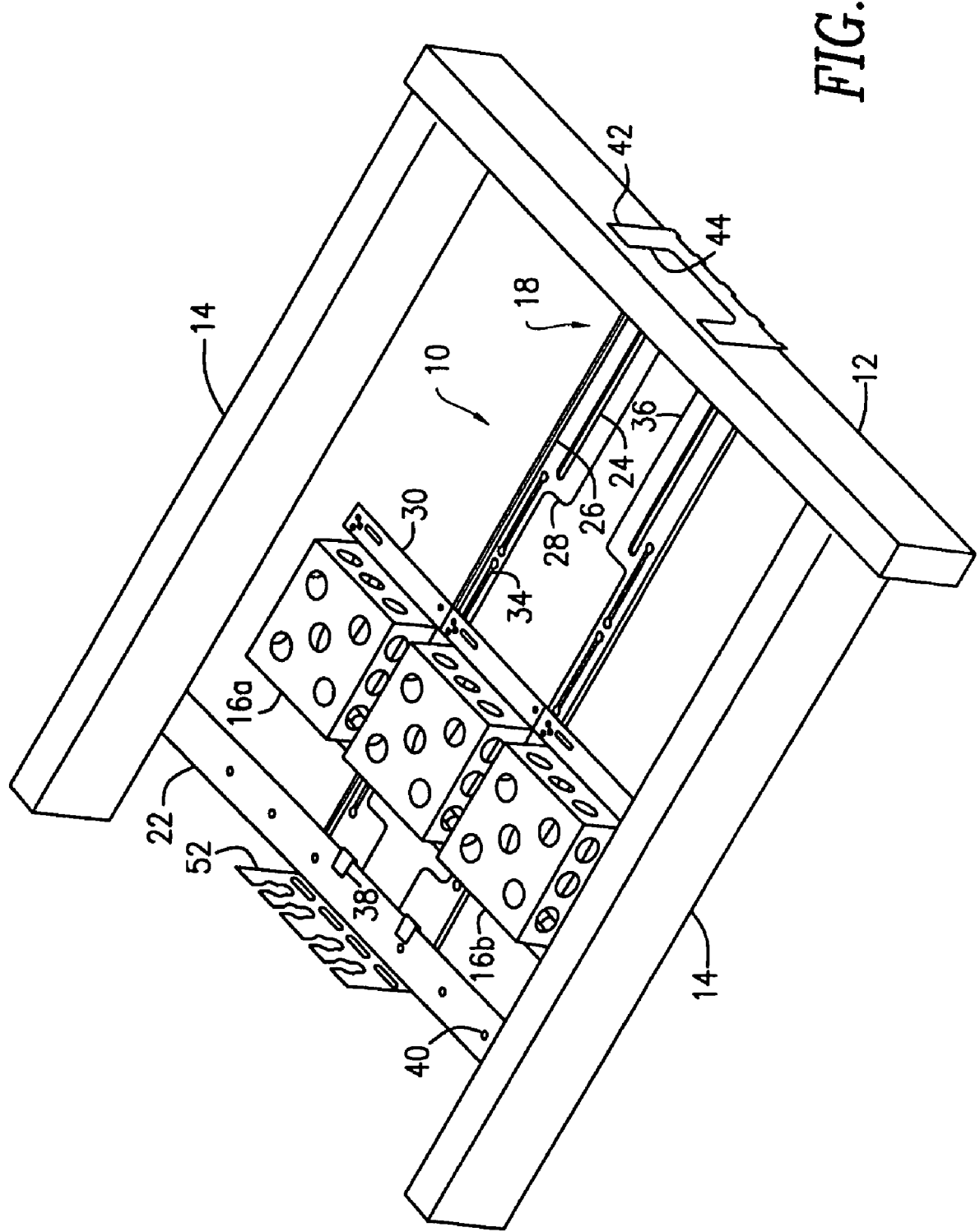
FIG. 4 is a pictorial view of the back side of the invention showing three boxes ganged together.

Upper bar supports 38 (the back side of which is shown in FIG. 4) should generally be designed so as to be spaced from each other as much as possible in order to provide bracket 10 with as much resistance to twisting about a vertical axis as possible. In the present embodiment, bar supports 38 are located on opposite sides of opening 36 adjacent stiffeners 26. However, if desired, bar supports could also be placed even closer to the elongated edges of bracket 10 so as to space them even further apart. On the other hand, if twisting is not an issue, then it is conceivable to design bracket 10 with only a single bar support 38 since one of the main purposes of bar 22 and associated bar support 38 is to restrict or reduce any deflection of bracket 10 into or away from the wall cavity between studs 14.

In the embodiment shown, bar supports 38 are constructed by displacing or offsetting a portion of the material of bracket 10 as indicated thereby creating a slot between the two into which bar 22 extends. This offset can be either towards the front or back of bracket 10. Other versions of bar support 38 can incorporate dimples or ribs or a ratchet mechanism to align bar 22 with bracket 10. Alternatively, bar support 38 can be configured with upper and lower displaced or offset portions. In some configurations of bar support 38, the end of bar 22 will first need to be slid into bar supports 38, in others, a mid-region of bar 22 can be directly mounted within bar support 38 (as is possible with the version shown in the drawings). These and other configurations are all equally possible, the main purpose of bar support 38 being to secure bar 22 to bracket 10 in a cost-effective, efficient manner while still allowing for some final adjustment to be made in the field.

Figure 5:
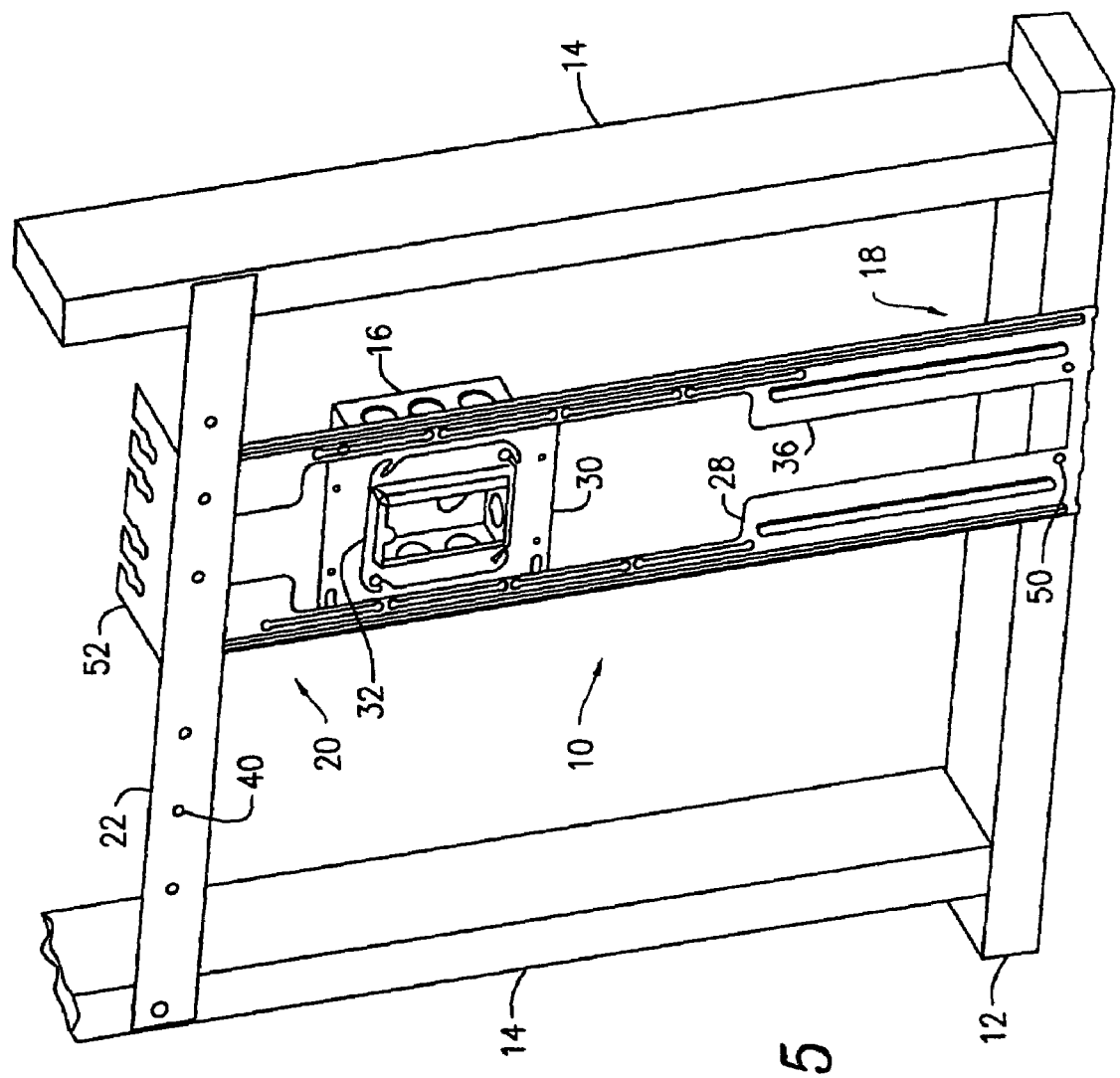
FIG. 5 is a pictorial view of the horizontal bar support being position in front of the floor bracket rather than behind it as in FIGS. 1 and 4.

It is also conceivable to simply affix bar 22 to bracket 10 via screws passing through the displaced portion of bar support 38 or through other areas of upper portion 20 of bracket 10. This option also has the advantage of rigidly securing bar 22 to bracket 10 at locations that are spaced a maximum distance from each other. The use of this method might be needed (even if bar supports 38 are available) such as in the case where there is a defect in stud 14 where bar 22 would normally be mounted when using bar support 38. Hence, bar 22 may need to be raised or lowered or even angled with respect to bracket 10 so as to avoid this defect. Furthermore, one end of bar 22 may be mounted to bracket 10 while another portion of bar 22 is affixed to a wall support. It is also conceivable that the installer may need to bend the end of bar 22 so as to mount it to the side of stud 14 and not to its front surface as shown in the drawings. FIG. 5 discloses yet another variation in that bar 22 is mounted to the front of bracket 10 rather than to its back as shown in other figures.

Referring once again to FIGS. 3 and 4, lower portion 18 of bracket 10 is shown in greater detail. Lower portion 18 includes lower flange 42 extending at a generally right angle to bracket 10 and having cut-out 44 therein. Lower flange 42 is designed to be slid or kicked under floor track 12. Obviously, the longer lower flange 42 extends away from bracket 10, the more difficult it may be to insert this flange 42 fully between the floor track and the floor. Hence, lower flange 42 may be designed so as not to extend too far away from bracket 10. Cut-out 44 is designed to avoid interference with any conduit rising up from the floor or any screws or nails securing floor track 12 to the floor at that location. In other words, should there be one or more obstructions in the floor at the location where bracket 10 is to be installed, then cut-out 44 is designed to accommodate them. Afterwards, lower portion 18 would be secured to floor track 12 via a screw or nail passing through opening 50. Alternatively, if cut-out 44 is not capable of avoiding such obstructions, or if it is not possible to slide flange 42 underneath floor track 12, then lower flange 42 can be removed in whole or in part from bracket 10 via score line 46 and slots 48 in the normal fashion. In this fashion, lower portion 18 would be secured to floor track 12 via opening 50 and the remaining portion of lower flange 42. Other embodiments of lower portion 18 include multiple cut-outs 44 separated by multiple extending portions of flange 42. What is unique about this latter design is that only a portion of lower flange 42 need be removed (i.e. that portion which is in interference with the existing conduit or fastener) and not the entire flange 42 as presently shown in the drawings.

Figure 6:
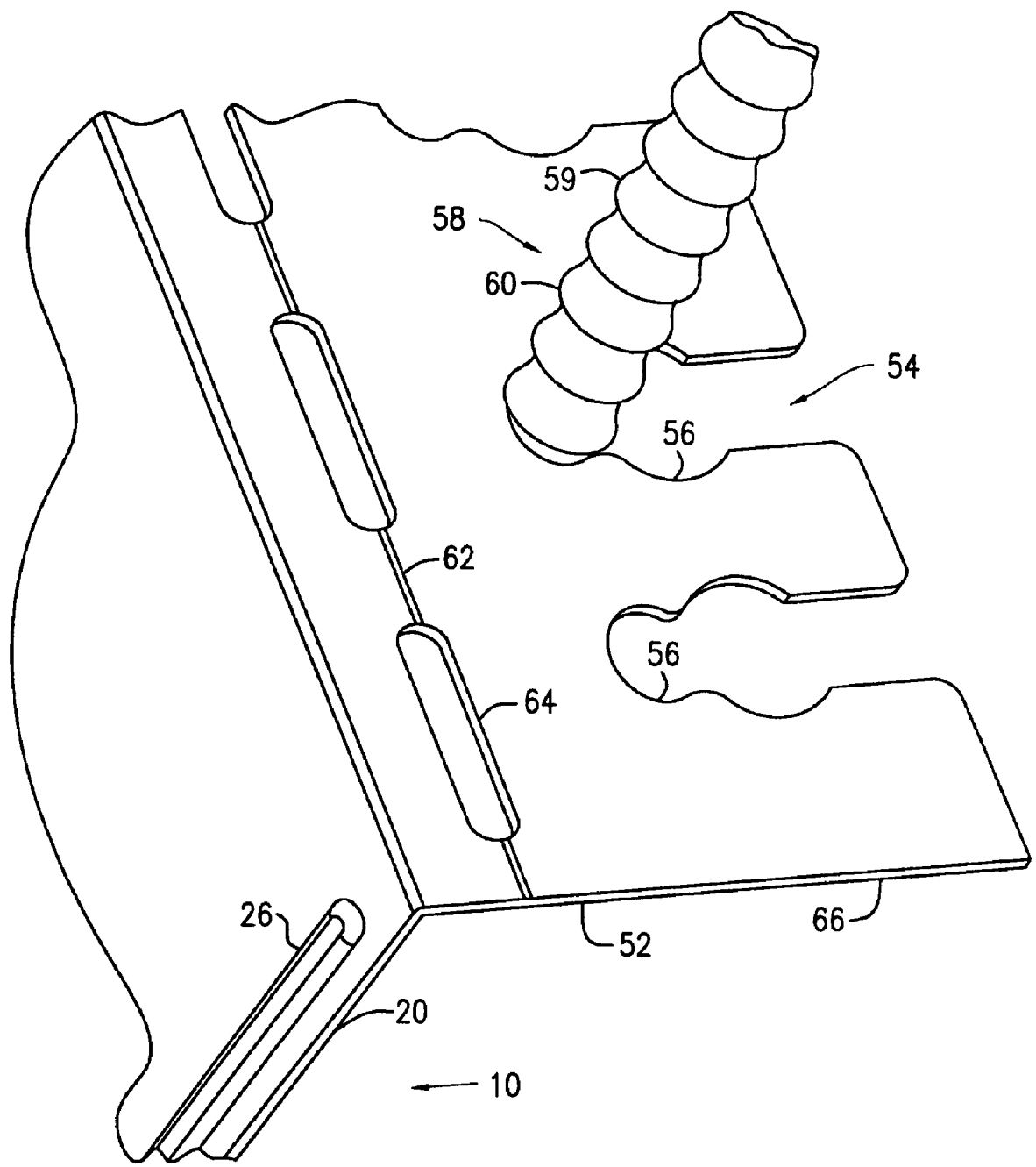
FIG. 6 is an enlarged pictorial view of the conduit support portion of the bracket shown in FIGS. 1-5.
Figure 8:
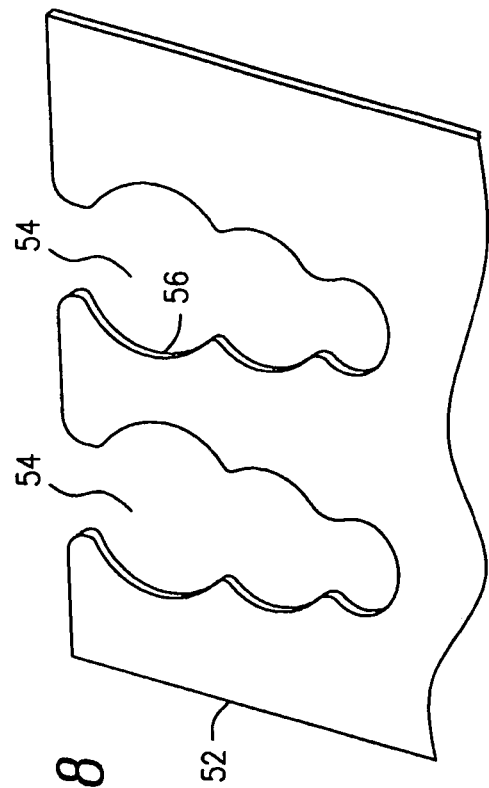
FIGS. 7-9 are various embodiments of the conduit support portion of the bracket shown in FIG. 6.
Figure 9:
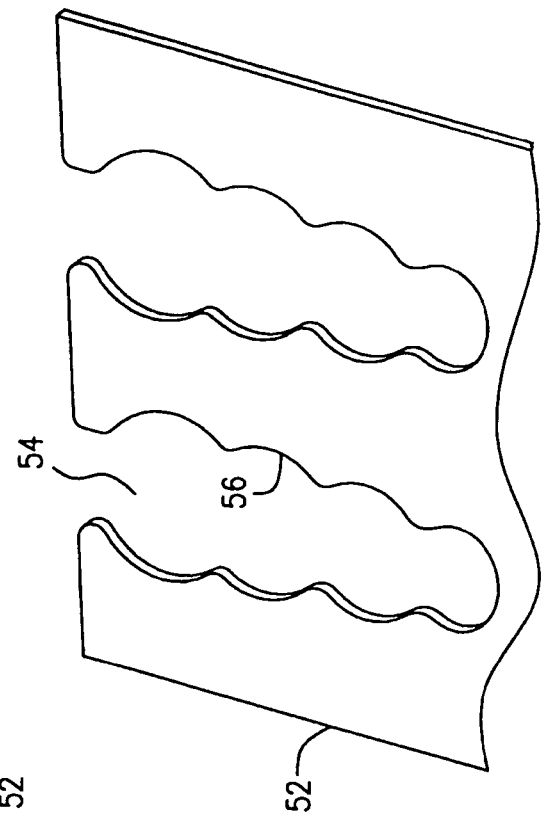
Figure 7:
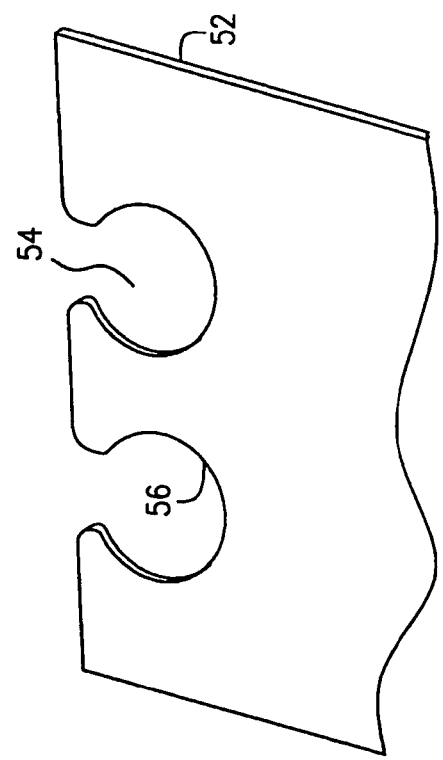

Referring now to FIGS. 6-9, upper portion 20 of bracket 10 incorporates an upper flange 52 having at least one opening 54 formed therein (the embodiments shown disclose a plurality of such openings 54). Each of the embodiments of FIGS. 6-9 disclose identical openings 54 extending along flange 52 but it is conceivable that flange 52 in each such embodiment may contain different or non-identical openings 54 as well. The obvious differences in the embodiments of FIGS. 6-9 are in the number and size of cut-outs 56 comprising each such opening 54. FIG. 7 discloses opening 54 with a single sized cut-out 56 while the other figures disclose openings 54 having multiple (and differently sized) cut-outs 56 therein. Each cut-out 56 is sized to be smaller than the outer external circumference of the spiral raised rib portion 59 of flexible conduit 58 which cut-out 56 is intended to support. Hence, different sized cut-outs 56 support different sized flexible conduits 58. Also, an opening 54 with multiple cut-outs 56 can support multiple flexible conduits 58 therein, there is no need to limit each opening 54 to supporting only a single flexible conduit 58. Thus, since the cut-outs 56 in an opening 54 may all be the same (or they may all be different), an opening 54 is capable of supporting a plurality of similarly sized flexible conduit 58 (or a plurality of differently sized flexible conduit 58) therein. It also goes without saying that an opening 54 may contain both similarly sized and differently sized cut-outs 56 therein. Any combination of quantity (i.e. number) and size of cut-outs 56 in each opening 54 are possible.

Referring now more specifically to FIG. 6, a typical flexible conduit 58 is shown which is externally configured with a spiral depression or recessed portion 60 between adjacent raised portions 59. Recessed portion 60 of flexible conduit 58 fits into cut-out 56 which causes adjacent raised (and larger) portion 59 to come to rest against that region of flange 52 surrounding cut-out 56. Hence, by this arrangement, conduit 58 is supported from flange 52. In some circumstances, the installer may need to angle conduit 58 to fit recessed portion 60 within cut-out 56 if he/she cannot insert conduit 58 directly into cut-out 56 from a vertical orientation. No bending of flange 52 is required to retain conduit 58 in place nor is any bending of flange 52 required to remove such conduit. However, it is not out of the realm of possibilities that an installer may still crimp flange 52 or otherwise modify the installation instructions simply to be further assured that conduit 58 is and remains supported from bracket 10. Flange 52 can accommodate this need for possible further assurance. It should also be noted that in the embodiment shown, flexible conduit 58 is shown as extending vertically within the wall cavity with each cut-out 56 being in a horizontal plane. However, this need not always be the case as flange 52 can also be adjusted so as to support a flexible conduit 58 that is angled within the wall cavity.

FIG. 6 also shows in greater detail score line 62 interrupted in its journey along flange 52 by spaced slots 64. Of course, slots 64 can be eliminated altogether leaving only score line 62, but this would make it harder to separate extending region 66 of flange 52 from bracket 10 (this extending region 66 being that portion of flange 52 containing openings 54). In some circumstances, it may be desirable to remove all or part of this extending region 66 if it interferes with other items in the wall cavity or if it hampers the installer's ability to reach and/or work on box 16. Should this be the case, then the installer need only remove this extending region 66 (or portion thereof) by flexing it up and down till it breaks along score line 62. Obviously, slots 64 are spaced so that openings 54 which contain flexible conduit 58 therein may remain attached to bracket 10 while un-used openings 54 can be disabled or removed as needed.

It should also be understood that this conduit support feature incorporating openings 54 and cut-outs 56 are equally suitable for use with wall-mounted box brackets that extend horizontally between studs 14 (not shown). In this version, extending region 66 would still extend into the wall cavity and all or portions of it could still be removed in the manner described should such be desired by the installer, but at the same time, the option is available in the event the installer desires to support conduit 58 therefrom. While it is anticipated that openings 54 and cut-outs 56 would extend along the length of this bracket spanning adjacent studs, it is also conceivable that only a portion of this bracket would incorporate such features.

Figure 10:
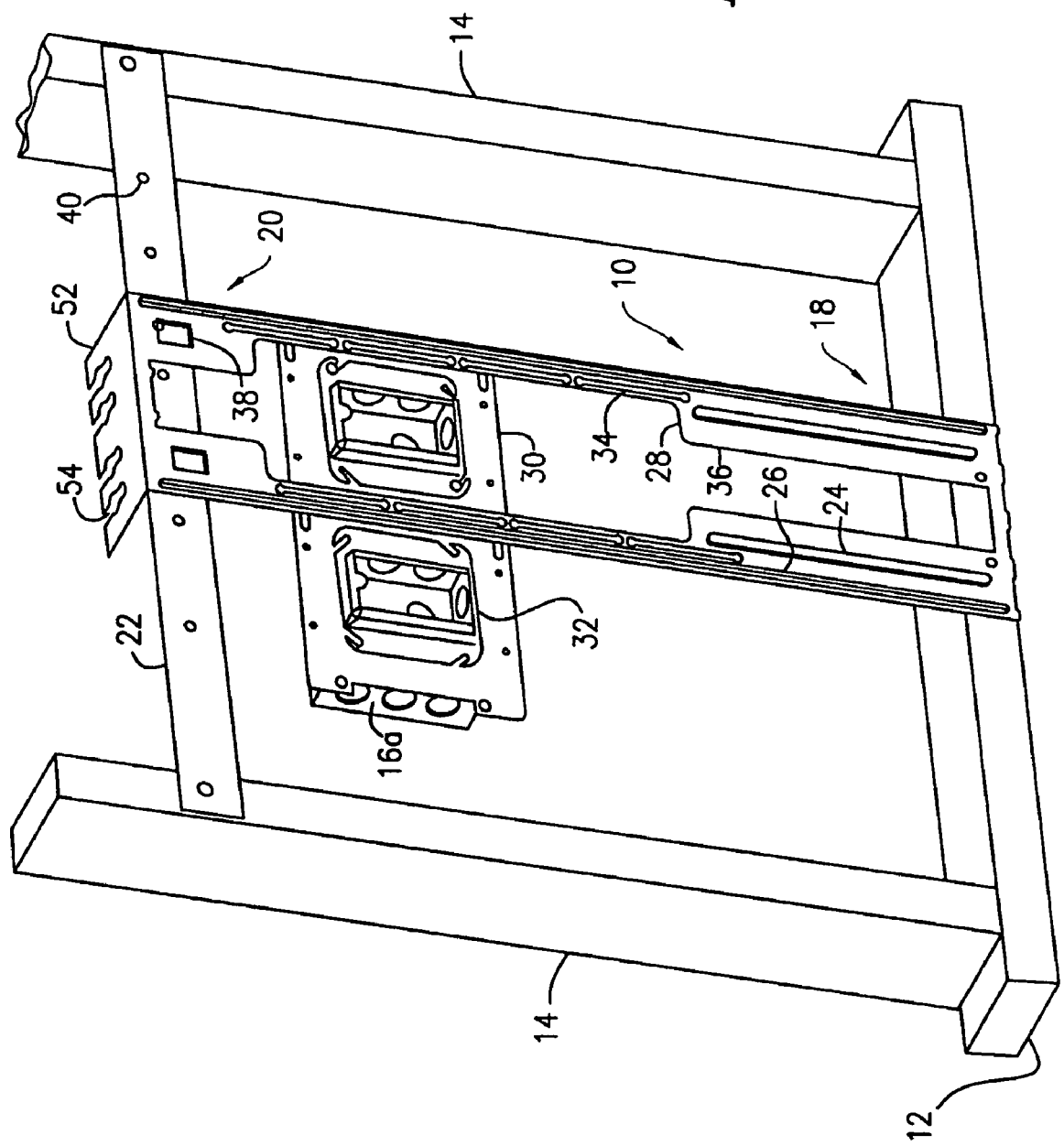
FIG. 10 is a pictorial view of the invention shown ganged with another electrical box

FIG. 10 shows bracket 10 installed to studs 14 in the same manner as described above with the additional disclosure of box 16 being ganged on its side to another box, box 16a. Such ganging is possible due to the configuration of adapter plate 30. Basically, since boxes 16 and 16a are each secured to their respective adapter plate 30, there are tabs on these adapter plates 30 that mesh or overlap with slots 34 of bracket such that these adapter plates 30 can be mounted to and supported from bracket 10.

FIG. 4 shows yet another configuration, this time illustrating two additional boxes (i.e. boxes 16a and 16b) being ganged on either side to box 16. Again, this is made possible by the configuration of adapter plate 30 and its manner of attachment to slots 34 of bracket 10 as well as its manner of overlapping or meshing with adjoining plate 30.

Figure 11:
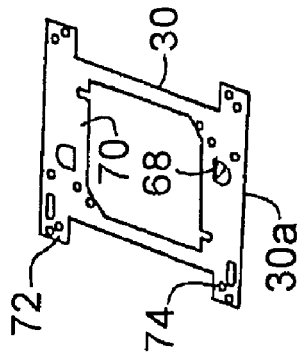
FIG. 11 is a top pictorial view of one version of the adapter plate.
Figure 12:
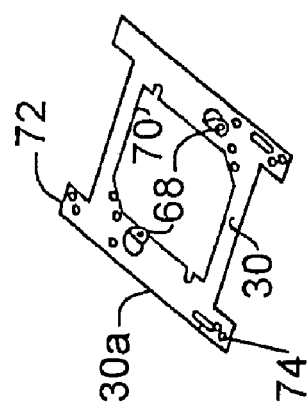
FIG. 12 is a bottom pictorial view of the adapter plate of FIG. 11.

FIGS. 11 and 12 show one version of adapter plate 30. In this version, adapter plate 30a is generally flat having two depending tabs 68 used to secure box 16 (or 16a or 16b, etc.) to plate 30a. These tabs 68 are designed to fit within the interior of box 16 and be secured to box 16 via screw openings typically provided in the side walls of box 16. As shown, the front face of adapter plate 30a contains traditional screw openings and slots as may be needed to further secure box 16 thereto or to secure cover/dry wall ring 32 thereto. The large central opening 70 in adapter plate 30a permits access to the interior of box 16. Each of the four corners of adapter plate 30a are configured with a tab 72 projecting outward having one or more fastener openings 74 therein. These fastener openings 74 are located so as to overlap with slots 34 in bracket 10 thereby enabling adapter plate 30a to be secured to bracket 10 via screws or the like. Ideally, the head of these screws would not be tightened or rotated against adapter plate 30a but instead would only be partially threaded into fastener openings 74 and would stand proud of adapter plate 30. In this fashion, the head of these screws would be able to pass through the keyhole portion of slots 34 thereby permitting adapter plate 30a (and attached box 16) to be slid along bracket 10 to the desired location before such screws are tightened. To gang one or more boxes 16a or 16b to bracket 10 (as shown in FIGS. 4 and 10), the tabs 72 on one adapter plate 30a would overlap the tabs 72 on the adjacent adapter plate 30a with the mounting screw passing through slot 34 and both tabs 72 thereby ganging or securing the two adapter plates 30a together.

Either before or after affixing adapter plate 30a to bracket 10, cover/dry wall ring would be mounted to adapter plate 30a using one of the openings provided in the front face of adapter plate 30a. Obviously, one set of screws are used to secure box 16 to adapter plate 30a, another set of screws are used to secure adapter plate 30a to bracket 10 and yet another set of screws are used to secure cover/dry wall ring to adapter plate 30a. Oftentimes, only diagonal screw openings are used for these purposes.

Figure 13:
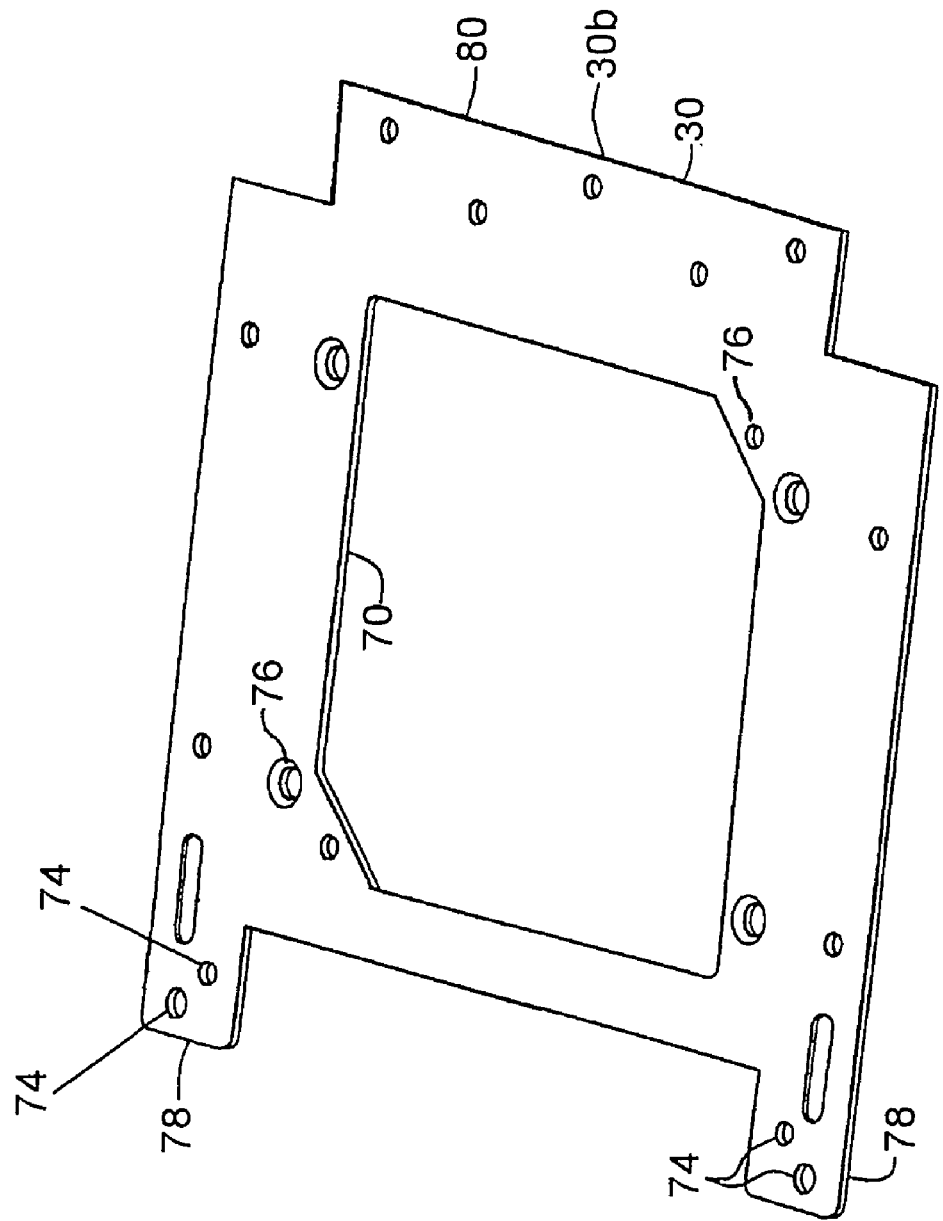
FIG. 13 is a top pictorial view of an alternate version of the adapter plate.
Figure 14:
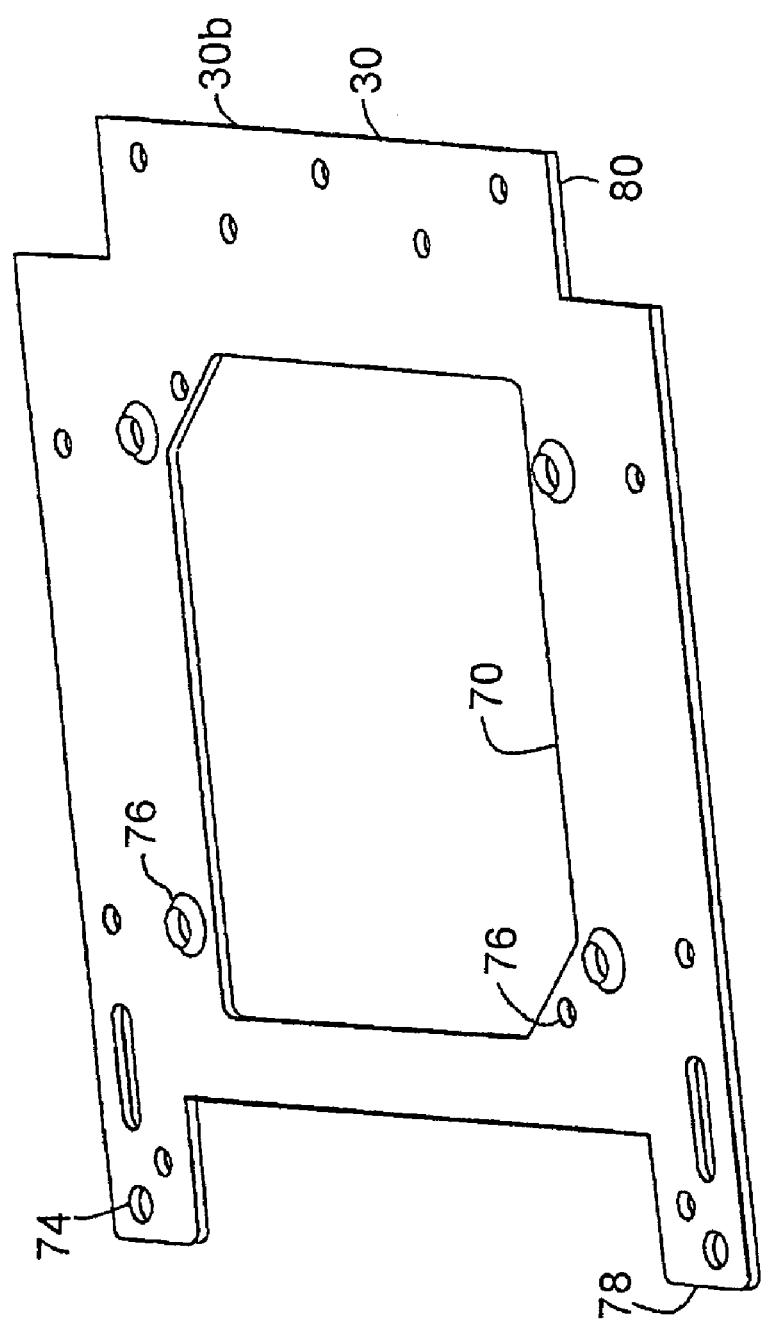
FIG. 14 is a bottom pictorial view of the alternate version of the adapter plate shown in FIG. 13.

FIGS. 13 and 14 disclose yet another embodiment of adapter plate 30. In this version, adapter plate 30b is planar and box 16 (or 16a or 16b, etc.) is secured to one or more openings 76 (whether circular or elongated) in adapter plate 30b in the traditional manner. While the interior arrangement and hole/slot locations of adapter plate 30b may be more traditional in nature, the exterior perimeter of adapter plate 30a is uniquely designed for use with bracket 10, and more particularly for use in ganging additional boxes to bracket 10. As shown, one side of adapter plate 30b is configured with upper and lower tabs 78 while the opposite side is configured with a single extension 80 sized to fit between the spaced apart tabs 78. Alternatively, extension 80 could be comprised of a plurality of extensions, the farthest ends thereof fitting between spaced tabs 78. It is also possible for other mating configurations to be employed, such as those that are hermaphroditic or those which might be a reverse image of each other. For purposes of further discussions, the side of adapter plate 30b having tabs 78 will be deemed the female end while the side of adapter plate 30b having extension 80 will be deemed the male end.

Adapter plate 30b is thus configured so that once it is mounted to bracket 10 via slots 34 as described above, another box affixed to a second adapter plate 30b can be readily mounted or ganged to bracket 10 without requiring any disassembly or removal of the previously mounted fixture. This is accomplished by affixing the male end of one adapter plate 30b adjacent the female end of the adjoining adapter plate 30b. The same can be said for both sides of adapter plate 30b that was originally affixed to bracket 10. A further advantage of this arrangement is that each adapter plate 30b having this male/female construction can now be mounted or ganged to bracket 10 or stud 14 in the same plane. This is not possible with the configuration of above adapter plate 30a since in that situation, tabs 72 of adjoining plates overlie each other thereby offsetting one adapter plate 30a behind the other. Due to the configuration of the mating sides of adapter plate 30b, this is not an issue since separate screws are used to mount each of the plates 30b to bracket 10 or to stud 14. Hence boxes may be ganged together or un-ganged from each other on bracket 10 without ever disturbing adjacent boxes or their mounting screws. Of course, each cover/dry wall ring 32 would be secured to adapter plate 30b in the fashion described above via their own fasteners and with the flange of this cover/dry wall ring 32 overlying the screws used to secure box 16 to adapter plate 30b.

Figure 15:
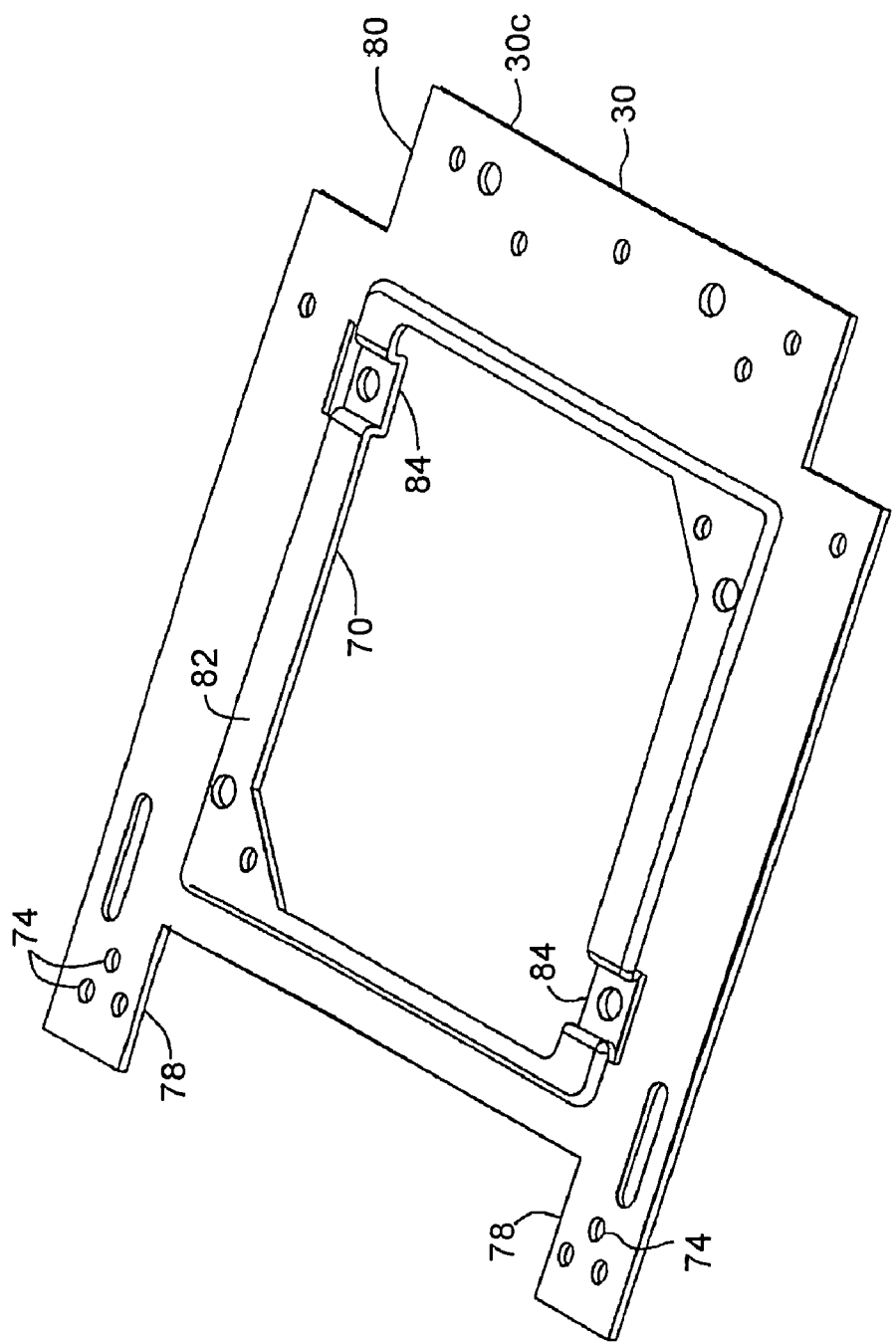
FIG. 15 is a top pictorial view of yet another alternate version of the adapter plate.
Figure 16:
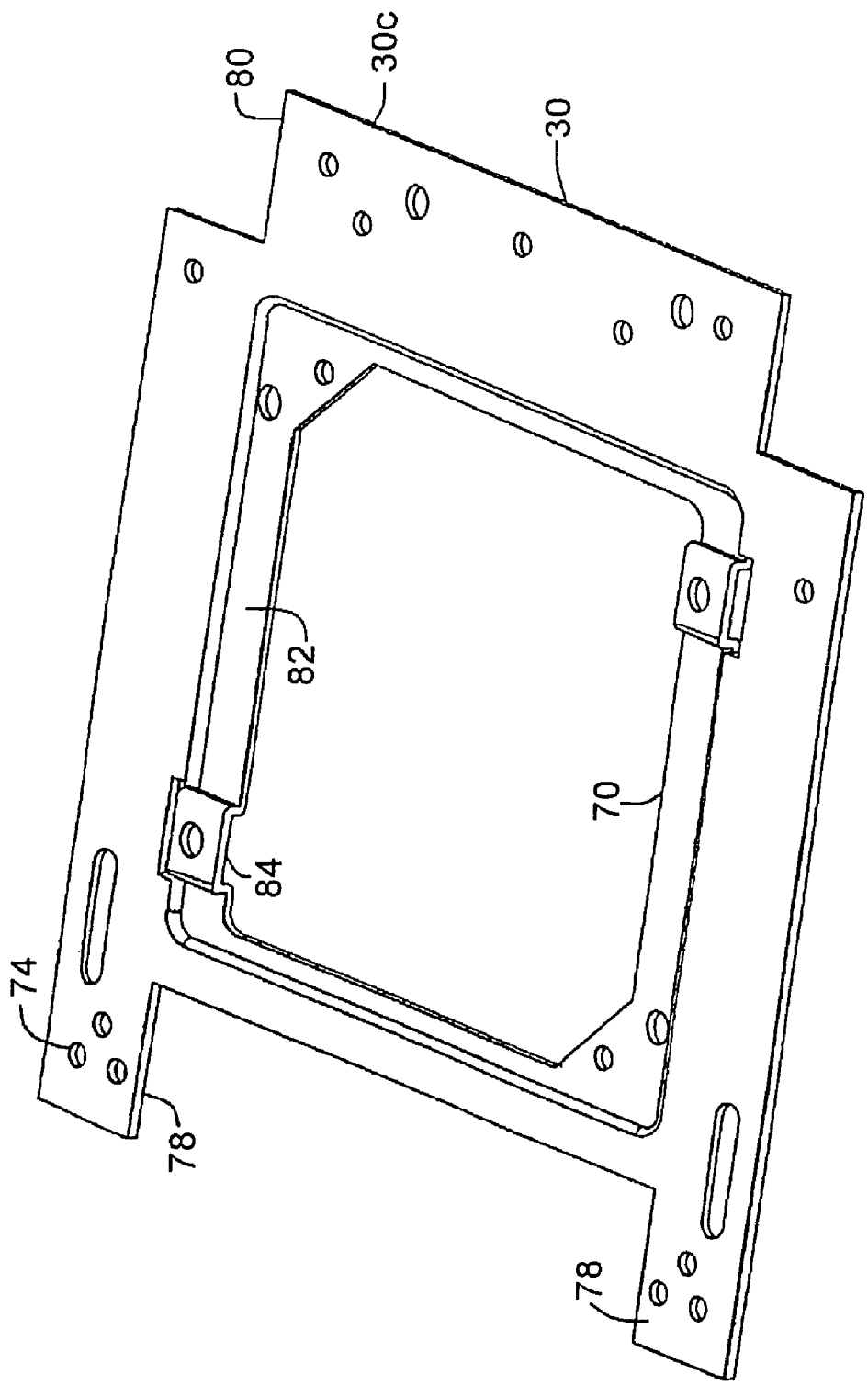
FIG. 16 is a bottom pictorial view of the alternate version of the adapter plate shown in FIG. 15.

FIGS. 15 and 16 show yet another version of adapter plate 30 which also incorporates mating male and female ends for ganging purposes as described above with respect to plate 30b. In this version, however, adapter plate 30c is non-planar as shown but still generally flat having both raised areas 82 and recessed areas 84 that form the perimeter or boundary region of central opening 70. Consequently, unlike the perimeters of central opening 70 in adapter plates 30a and 30b, the perimeter of opening 70 in adapter plate 30c is not all in the same plane. Instead, a portion of the perimeter of central opening 70 in adapter plate 30c is below that of the general plane of plate 30c while another portion of the perimeter of central opening 70 in adapter plate 30c is above that of the general plane of plate 30c. These raised and recessed areas 82 and 84, each of which extend along their own spaced and parallel planes, are illustrated as being raised or lowered by about the thickness of adapter plate 30c.

One advantage of this configuration of adapter plate 30c is the fact that these raised and recessed areas 82 and 84 actually cause box 16 to be mounted more firmly to adapter plate 30c with fewer open areas or gaps between them. This is because in traditional 4-11/16 inch sized electrical boxes, the mounting tabs on the box are bent inwardly and extend in a plane that is below that of the adjacent sidewall edges defining the open perimeter of the box. Hence, when a planar cover or other device is mounted to such boxes, there is created an opening or gap between the cover and the open perimeter edge of the box where the tabs are bent inwardly. In contrast, this adapter plate 30c is configured to more closely conform to and abut with the different (and offset) regions surrounding the outlet box opening.

As is well known, code specifications limit very precisely the amount of open area that is permitted in a box 16 for safety purposes. Hence, by employing the above adapter plate 30c, and particularly its recessed features 84, adapter plate 30c more closely conforms to the height variations along the perimeter of the open side of the traditional box. Thus this adapter plate 30c eliminates some heretofore open areas between the box and the more traditional planar covers for such boxes. Consequently, there is now more allowance for additional openings elsewhere in the box that may make this box/adapter plate combination more attractive to end users.

Figure 17:
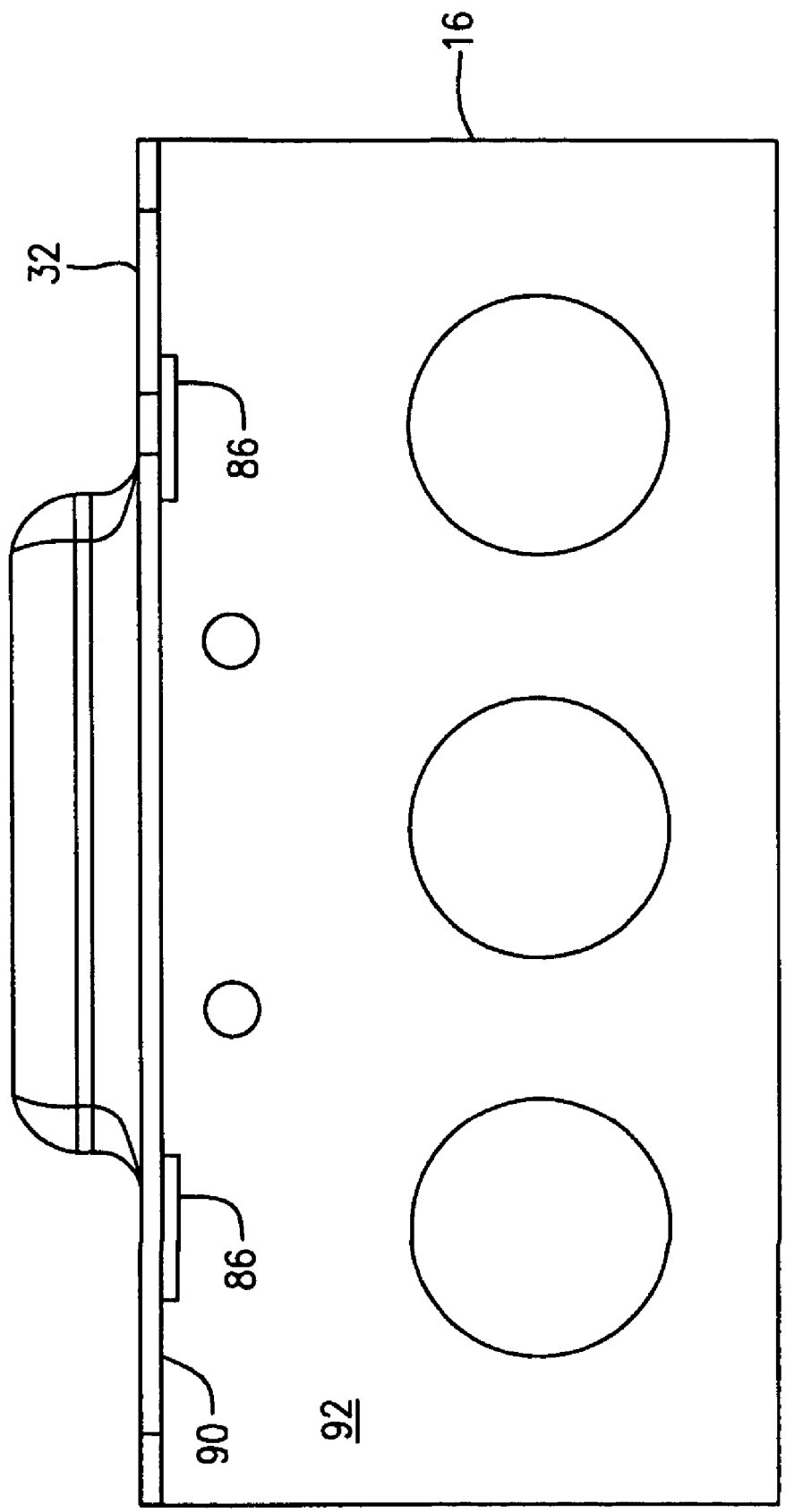
FIG. 17 is a side elevation view of a typical electrical box with typical cover ring secured thereto.
Figure 18:
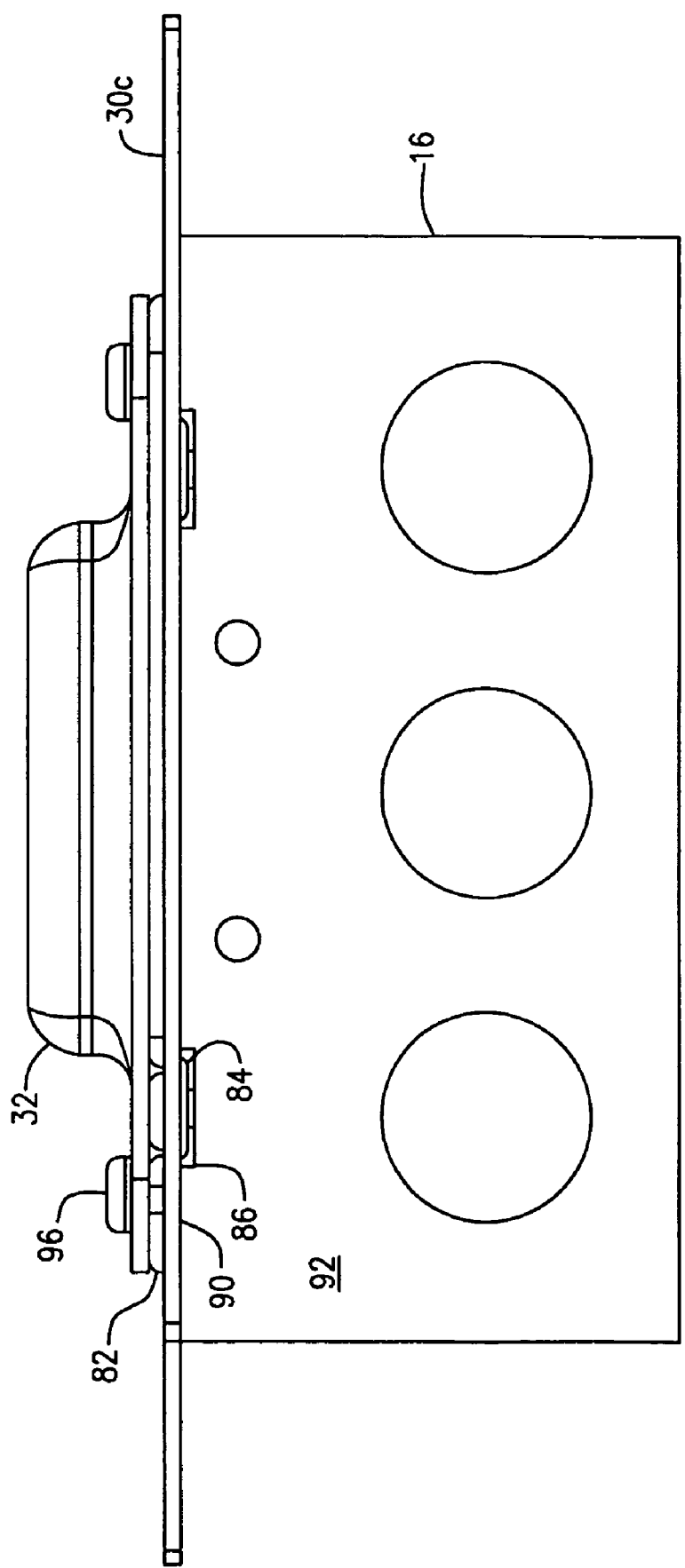
FIG. 18 is a side elevation view of a typical electrical box with an adapter plate mounted between the box and a typical cover.
Figure 19:
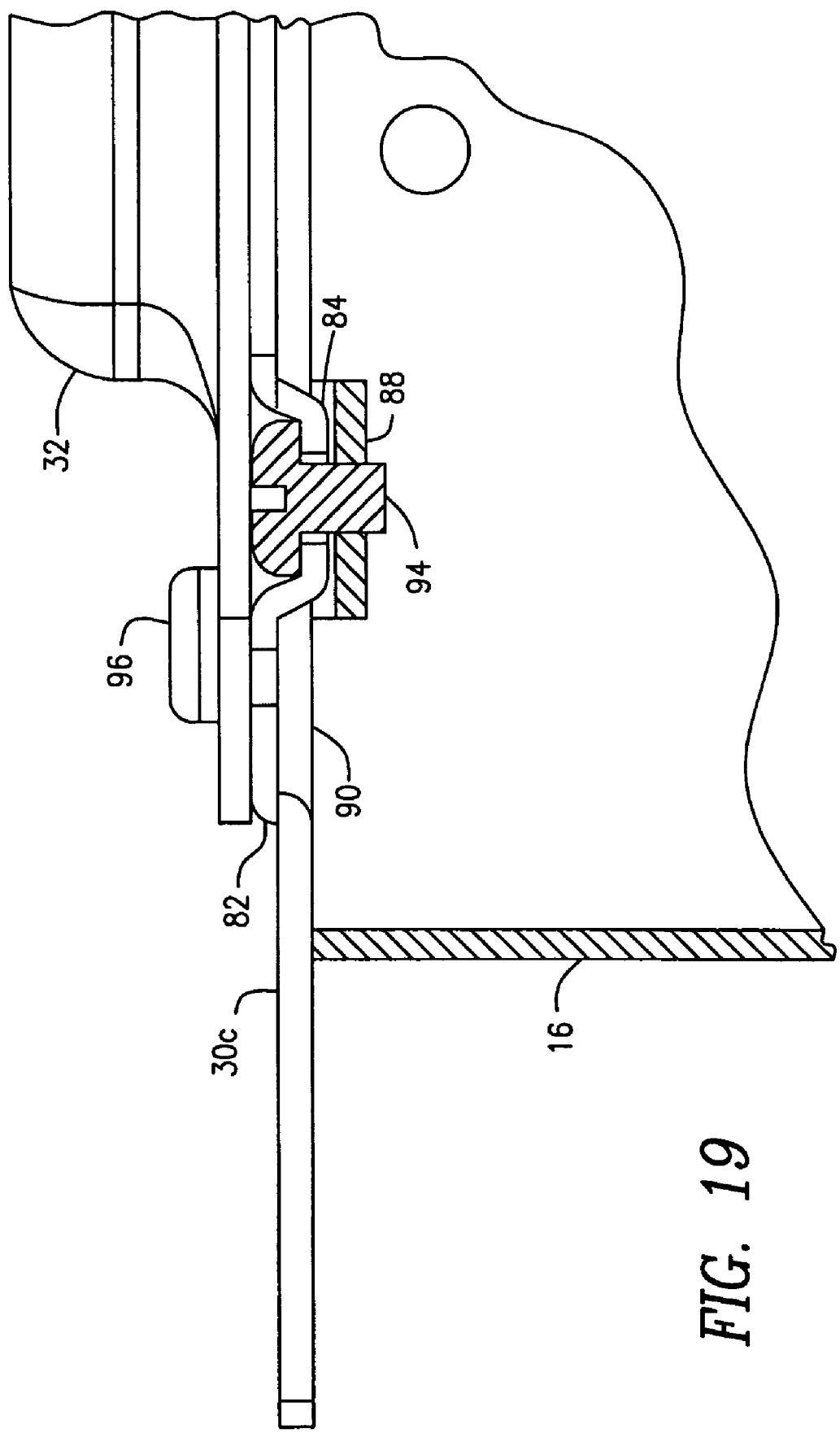
FIG. 19 is a detailed view of a portion of FIG. 18 showing the mounting screw used to secure the adapter plate to the box.

FIGS. 17-19 illustrate this feature more fully. FIG. 17 shows a side view of a typical 4-11/16 inch box 16 with typical cover/dry wall ring 32 secured thereto. As can be seen, openings 86 are created between the two. These openings 86 are created due to the formation of box 16 which is configured with mounting tabs 88 (FIG. 19) bent inwardly and extending in a plane slightly below that of the box opening. Hence, the upper ends 90 of sidewalls 92 of box 16 extend slightly above these bent tabs thereby creating openings 86 when cover 32 is installed. By employing or abutting adapter plate 30c as shown in FIG. 18, recessed area 84 of the plate fills in this previously open area. Consequently, there is less likelihood that a foreign object will penetrate the box enclosure or come into contact with the wiring therein.

Figure 20:
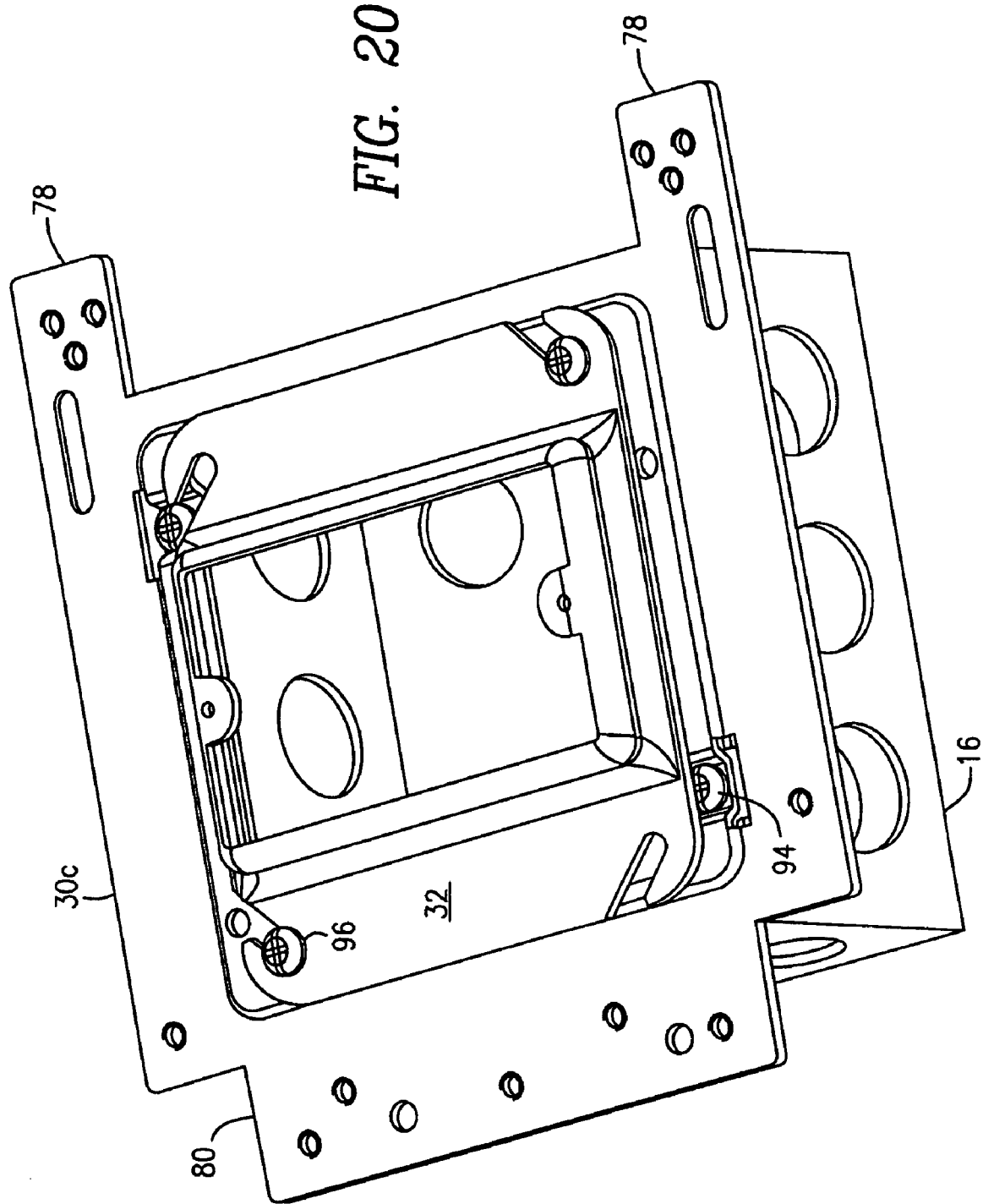
FIG. 20 is a pictorial view of the box, adapter plate and cover ring assembly.

In the embodiment shown, recessed area 84 extends below plate 30c by about its material thickness. Likewise, raised area 82 extends above plate 30c by a similar distance. Hence, due to these raised and recessed areas 82 and 84, an offset between the two sufficient for the head of fastener 94 is created. It should also be pointed out that this configuration of raised and recessed areas 82 and 84 causes the perimeter of opening 70 to not all be in the same plane but instead be in parallel but spaced planes. FIG. 19 is a more detailed view of FIG. 18 and shows fastener 94 which secures box 16 to adapter plate 30c. The head of fastener 94 is covered by cover/dry wall ring 32. A separate fastener, 96, secures cover 32 to adapter plate 30c via one of the fastener openings in plate 30c. This is better shown in FIG. 20.

It should also be pointed out that for each of adapter plates 30a, 30b, and 30c, they can also be mounted directly to a stud 14 or other wall structure without needing to be secured to bracket 10. Adapter plates 30 can be installed on opposite sides of stud 14 or ganged together on the same side of stud 14. The various fastener openings (or those adjacent thereto) that are used to secure these plates 30a, 30b, 30c to bracket 10 can also be used to secure such plate directly to stud 14 or other wall structure of the building. Should the elongated fastener openings be selected, then some degree of adjustability is now available to the installer. Box 16 and cover/dry wall ring 32 would, of course, still be mounted to plate 30 as described above. In the event there is a desire to gang two or more boxes 16, 16a, 16b from the same side of stud 14 or wall structure, such can be easily accomplished via the configuration of plate 30a, 30b, 30c. Plate 30a would gang adjacent boxes together by simply overlapping tabs 72 and fastening them together. Both plates 30b and 30c would gang adjacent boxes together by mating like sides together (male/male or female/female) and then fastening them together. In all three situations, however, adjacent plates 30 would be in different planes. It is also conceivable as shown in FIG. 23 that adapter plate 30 can be used or ganged for use as a low voltage bracket without the need to have an electrical box secured thereto.

Another useful feature of adapter plate 30 is not only its use with floor-mounted bracket 10, but it can also be used to mount box 16 to a wall-mounted bracket that spans horizontally between two studs 14. More traditional horizontal wall-mounted brackets are configured so as to mount the box directly to the bracket. This limits the further attachment of devices or covers to such box. However, with the use of the present invention of securing box 16 to one of adapter plates 30, and then securing this adapter plate 30 to the wall-bracket, more options are available to the installer, such as the choice in size of cover/dry wall ring 32 to use. This would not be possible if the box were attached to the horizontal bracket without adapter plate 30. In this version, adapter plate 30 would be secured to the horizontal wall-bracket via the same plate extensions and fastener openings used to secure such plate 30 to bracket 10. Hence the advantages of adapter plate 30 are available for both vertical floor-mounted brackets as well as horizontal wall-mounted brackets.

While some of the above discussion was with respect to a 4-11/16 inch size box, it is to be understood that boxes and/or covers having other sizes are also candidates for use with this invention. For example, assuming that a 4-11/16 inch box is mounted to any of adapter plates 30a, 30b or 30c, such plate 30 contains openings therein that can then accept either a cover/dry wall ring 32 that is sized for a 4 inch box or a different cover/dry wall ring 32 sized for a 4-11/16 inch box. Either cover/dry wall ring 32 will overlay the central opening 70 in each of adapter plates 30.

Figure 21:
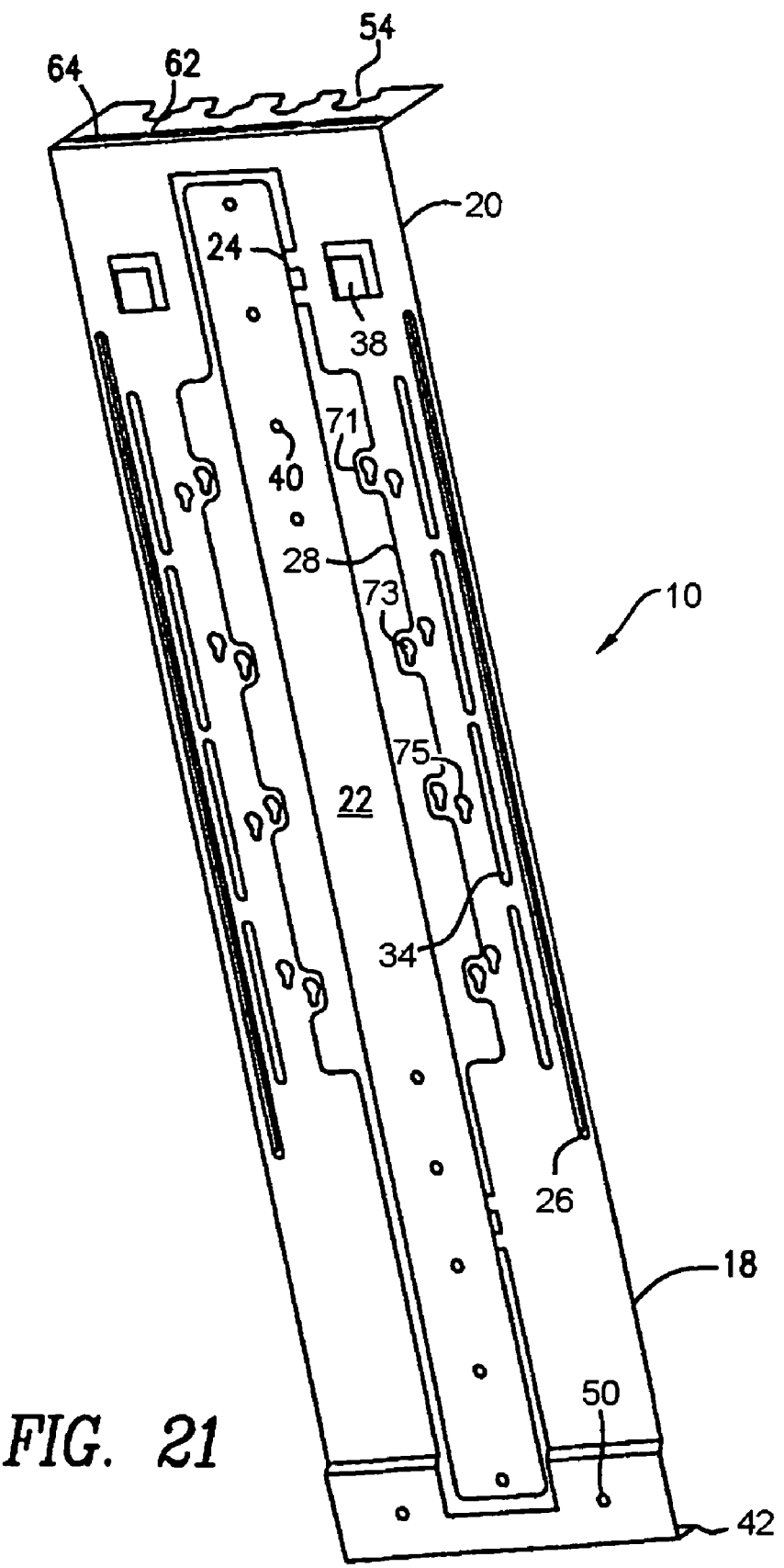
FIG. 21 is a pictorial view of an alternate embodiment of the invention.
Figure 22:
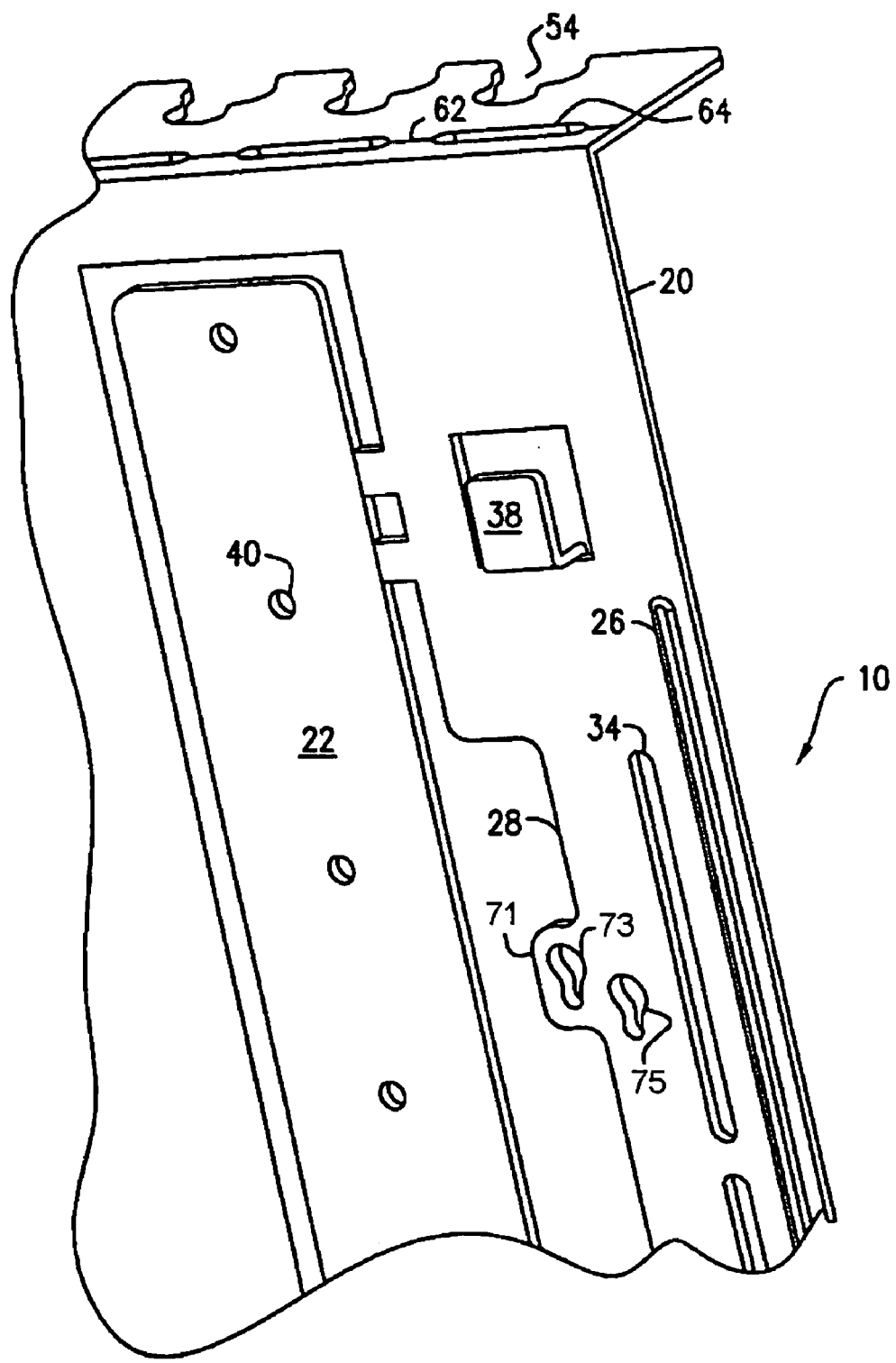
FIG. 22 is an enlarged pictorial view of the upper mounting region of the alternate embodiment shown in FIG. 21.
Figure 23:
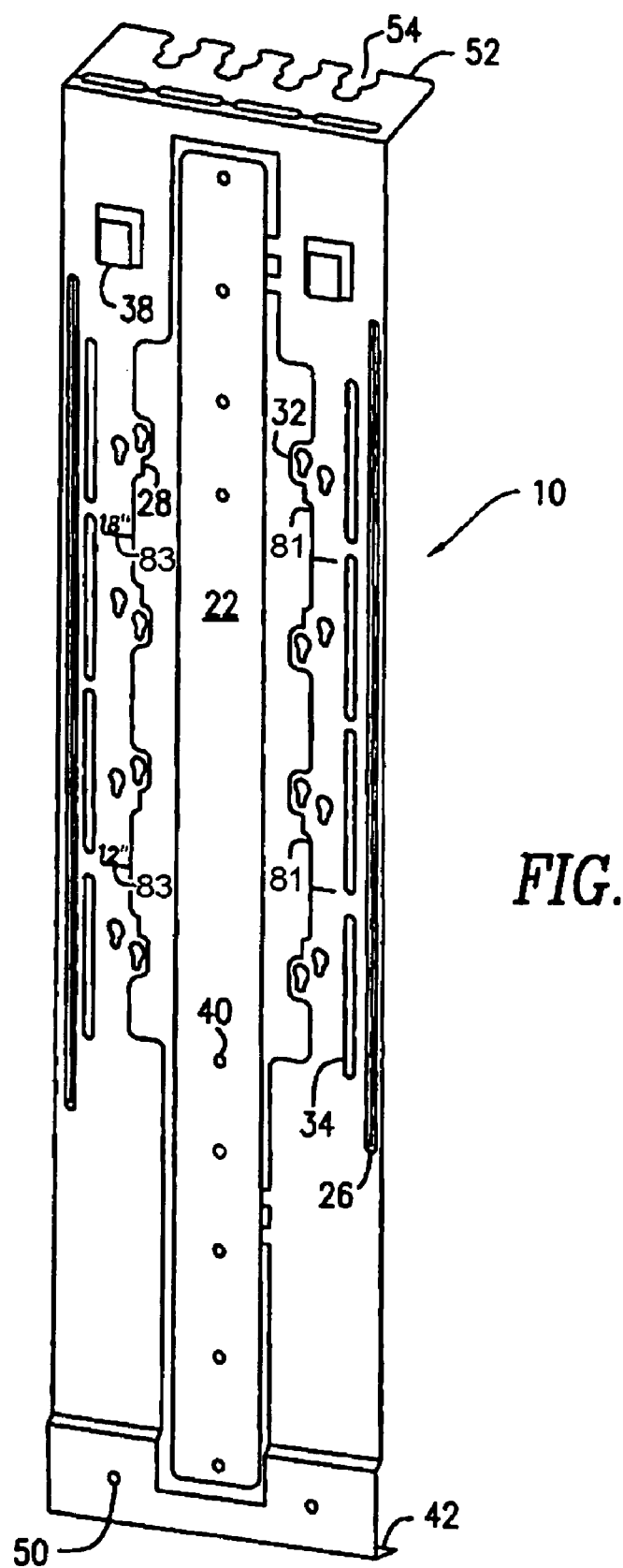
FIG. 23 is a pictorial view of yet another alternate embodiment of the invention.

Referring now more specifically to the embodiment shown in FIGS. 21-23, once bar 22 is removed from bracket 10, central opening 28 is created that permits access to the interior of the box that is secured to the bracket. Central opening 28 is configured with a series of tabs 71 along its perimeter each having a keyhole slot 73 therein. Adjacent these keyhole slots 73 is another keyhole slot 75. The location and spacing of tabs 71 and keyholes 73 and 75 are such that they permit a box to be mounted a certain fixed pre-determined distance above the floor without requiring any measuring or the like in the field and without requiring an adapter plate as discussed above. This greatly simplifies installation. For example, lower slots 73/75 can be used to mount a box 12 inches above the floor while upper slots 73/75 can be used to mount a box 18 inches above the floor in order to conform to local code or other governmental regulation. The screw heads of the screws used to mount the box to the bracket would pass through these keyhole slots 73/75 in the normal fashion.

If a different box height is desired, either the bracket can be specially constructed or the installer can employ a separate adapter plate as discussed above that would be secured to the bracket via fasteners passing through elongated slots 34 (which may or may not have a keyhole shape). The box would then be mounted to the adapter plate intermediate slots 34. This would permit the box/adapter plate combination to be slid along slots 34 to the desired height. Such an adapter plate would also be used if there is a desire to gang boxes on either (or both) sides of bracket 10 (the adapter plate being secured to only one set of slots 34 and extending away from bracket 10).

In this embodiment, keyhole slots 73 are spaced and configured so as to mount a standard 4 inch box to the bracket, the keyholes permitting such attachment without requiring the screws to be removed from the box. Likewise, in this embodiment, keyhole slots 75 are spaced and configured to mount a standard 4-{fraction (11/16)}inch box to the bracket in the same manner. Please note that these standard boxes come with the screws partially threaded (i.e. the head portion is not fully tightened against the box). Hence the installer need simply insert the extending head portion of the screws into the appropriate keyhole slot and then tighten. Tabs 71 and keyholes 73 and 75 are arranged and spaced to conform to standard boxes and their respective mounting openings and screws. However, they may also be configured to accommodate other box sizes and spacings.

Now if desired, a dry-wall or plaster ring 32 or some other standard cover can be mounted too. If such is desired, the same mounting screws passing through the keyhole slots 73/75 can be used to secure this cover or ring in the normal sense. However, if an adapter plate is used as described above, then the adapter plate may end up intermediate or 'sandwiched' between the box and the cover. This would be the case in order to utilize the box mounting screws (the adapter plate employing a different set of fasteners that pass through elongated slots 34 as described above).

Upper portion 20 is also configured with a series of openings 54 through which a conduit may pass. These openings 54 are specially configured to be smaller than the external circumference of the spiral raised rib portion of the flexible conduit which openings 54 are intended to support. Openings 54 may also be configured with different diameters so as to accommodate differently sized flexible conduit. Upper portion 20 may also be configured with score line 62 and/or slit 64 that enables a user to eliminate one or more openings 54 in case there is interference within the wall cavity.

The embodiment shown in FIG. 23 is only slightly different from that of FIGS. 21 & 22. In FIG. 23, central opening 28 is shown as being further 'notched' 81 so as to provide even more access to the interior of box 16 when mounted on bracket 10. Additionally, indices 83 are provided to inform the installer which set of keyhole slots 73/75 are to be used when positioning box 16 at either 12 or 18 inches above the floor.

While not shown in the drawings, it is also conceivable for that portion of bracket 10 surrounding central opening 28 to be thinner than the remainder of bracket 10. In this fashion, when slots 73/75 are used to secure box 16 to the bracket, and when a cover plate 32 is affixed to the opposite side of bracket 10, the gap between box 16 and cover plate 32 on opposite sides is minimized.

While select preferred embodiments of this invention have been illustrated, many modifications may occur to those skilled in the art and therefore it is to be understood that these modifications are incorporated within these embodiments as fully as if they were fully illustrated and described herein.

What is claimed is:

1. A mounting system for securing an electrical box having an open side thereof within a wall of a building comprising:
    (a) a generally elongated bracket having a length defined by two opposing end regions and at least one mounting aperture in one end region, wherein said at least one mounting aperture is used to attach said elongated bracket to a wall structure;
    (b) an opening in said elongated bracket through which the open side of the electrical box is accessed;
    (c) an adapter plate comprising a generally centrally located opening therein through which the open side of the electrical box is accessed;
    (d) a plurality of plate mounting apertures in both said adapter plate and said elongated bracket for securing said adapter plate to said bracket; and
    (e) a plurality of electrical box mounting apertures in said adapter plate, wherein said electrical box mounting apertures are used to secure the electrical box to said adapter plate.

2. The mounting system as set forth in claim 1 wherein at least one of said plate mounting apertures in said adapter plate is an elongated slot or a keyhole aperture.

3. The mounting system as set forth in claim 1 wherein at least one of said plate mounting apertures in said bracket is an elongated slot or a keyhole aperture.

4. The mounting system as set forth in claim 1 wherein the opening in the elongated bracket substantially extends between the opposing end regions.

5. The mounting system as set forth in claim 1 wherein both of the opposing end regions have mounting apertures.

6. The mounting system as set forth in claim 5 further comprising an elongated bar mounted to one of said opposing end regions of said elongated bracket, said elongated bar comprising a pair of opposite ends having one or more mounting apertures.

7. The mounting system as set forth in claim 1 wherein said adapter plate supports a separate and distinct plaster/dry wall ring therefrom.

8. The mounting system as set forth in claim 1 wherein the adapter plate further comprises a pair of opposite side regions and wherein said plate mounting apertures in said adapter plate is are located on said pair of opposite side regions of said adapter plate.

9. The mounting system as set forth in claim 8 wherein a plurality of said adapter plates are secured to said elongated bracket.

10. An adapter plate assembly for supporting an electrical box having an open side thereof within a wall of a building comprising:
    (a) an adapter plate comprising a pair of opposite side regions and having an opening therein through which the open side of the electrical box is accessed;
    (b) a plurality of adapter plate mounting structures on said adapter plate, wherein said mounting structures are used to secure said adapter plate to a wall structure, to an adjacent adapter plate, or to a separate bracket affixed to the wall structure;
    (c) a plurality of box mounting structures on said adapter plate, wherein said box mounting structures are used to secure the electrical box to said adapter plate and
    (d) a generally elongated bracket having a length defined by two opposing end regions and at least one mounting aperture in one end region, wherein said at least one mounting aperture is used to attach said elongated bracket to a wall structure and wherein said adapter plate is attached to said elongated bracket.

11. The adapter plate assembly as set forth in claim 10 wherein at least one of said adapter plate mounting structures is an aperture.

12. The adapter plate assembly as set forth in claim 10 wherein said adapter supports a separate and distinct plaster/dry wall ring therefrom.

13. The adapter plate assembly as set forth in claim 10 wherein at least one adapter plate mounting structure is located on each of the opposite side regions of said adapter plate.

14. The adapter plate assembly as set forth in claim 13 wherein a plurality of said adapter plates are secured to said separate bracket.

15. A box mounting system for securing a plurality of electrical boxes within a wall of a building comprising:
    (a) a generally elongated bracket having a first opening therein and a length defined by a pair of opposing end regions, wherein at least a first opposing end region comprises a first mounting aperture for securing said elongated bracket to the wall;
    (b) a first electrical box positioned in said first opening and secured to said elongated bracket;
    (c) an adapter plate having a second opening therein and mounted to said elongated bracket alongside and adjacent to said first electrical box;

(d) a second electrical box positioned in said second opening and secured to said adapter plate; and (e) an elongated bar having opposite ends, wherein said elongated bar is secured to a second opposing end region of said elongated bracket and wherein said elongated bar has at least one mounting aperture in each of said opposite ends for securing said elongated bar to the wall.

16. The box mounting system as set forth in claim 15 wherein said adapter plate is secured to a front surface of said elongated bracket via a first plurality of mounting apertures in said elongated bracket and a second plurality of mounting apertures in said adapter plate.

17. The box mounting system as set forth in claim 16 wherein a plurality of adapter plates are secured to said elongated bracket, said adapter plates extending generally perpendicular to said length of said elongated bracket and on opposite sides of said first electrical box.

18. An electrical box mounting system comprising:
(a) a generally elongated bracket having a length defined by two opposing end regions and at least one mounting aperture in at least one end region, wherein said at least one mounting aperture is used to attach said elongated bracket to a wall structure;
(b) a first opening in said elongated bracket extending substantially the entire length of the elongated bracket between said two opposing end regions;
(c) an adapter plate comprising a second opening for receiving an electrical box therein, wherein said second opening is smaller than said first opening and wherein said adapter is positioned on said elongated bracket so that the location of said second opening corresponds to the location of said first opening;
(d) a first plurality of mounting apertures in said adapter plate;
(e) a second plurality of mounting apertures in said elongated bracket, wherein the locations of at least two of said first plurality of mounting apertures correspond to the locations of at least two of said second plurality of mounting apertures;
(f) at least two mounting screws, wherein said mounting screws pass through said at least two of said first plurality of mounting apertures corresponding to said at least two of said second plurality of mounting apertures to secure said adapter plate to said elongated bracket; and
(g) a plurality of electrical box mounting apertures in said adapter plate, wherein said electrical box mounting apertures are used to secure the electrical box to said adapter plate.

19. The electrical box mounting system as set forth in claim 18 wherein said first plurality of mounting apertures comprises at least one slot or keyhole aperture.

20. The electrical box mounting system as set forth in claim 18 wherein said second plurality of mounting apertures comprises at least one slot or keyhole aperture.

* * * * *

UNITED STATES PATENT AND TRADEMARK OFFICE
CERTIFICATE OF CORRECTION

PATENT NO. : 7,271,335 B2  Page 1 of 1
APPLICATION NO. : 10/944529
DATED : September 18, 2007
INVENTOR(S) : Cong Thanh Dinh It is certified that error appears in the above-identified patent and that said Letters Patent is hereby corrected as shown below:

COVER PAGE:

Attorney, Agent, or Firm     now reads:     "Hoffman & Baron, LLP"

should read:     --Hoffmann & Baron, LLP--

CLAIMS:

Claim 8, line 4     now reads:     "adapter plate is are located on said pair of opposite side"

should read:     --adapter plate are located on said pair of opposite side--

Signed and Sealed this

Sixth Day of May, 2008

JON W. DUDAS
*Director of the United States Patent and Trademark Office*